US010377635B2

(12) United States Patent
Ohta et al.

(10) Patent No.: US 10,377,635 B2
(45) Date of Patent: *Aug. 13, 2019

(54) METHOD FOR IMPROVING THE FLATNESS OF GRAPHITE FILM, GRAPHITE FILM, AND METHOD FOR PRODUCING SAME

(71) Applicant: KANEKA CORPORATION, Osaka (JP)

(72) Inventors: Yusuke Ohta, Settsu (JP); Takashi Inada, Settsu (JP); Makoto Mishiro, Settsu (JP); Takashi Inada, Settsu (JP); Yasushi Nishikawa, Settsu (JP)

(73) Assignee: KANEKA CORPORATION, Osaka (JP)

( * ) Notice: Subject to any disclaimer, the term of this patent is extended or adjusted under 35 U.S.C. 154(b) by 884 days.

This patent is subject to a terminal disclaimer.

(21) Appl. No.: 14/515,200

(22) Filed: Oct. 15, 2014

(65) Prior Publication Data
US 2015/0030841 A1 Jan. 29, 2015

Related U.S. Application Data

(63) Continuation of application No. 13/700,580, filed as application No. PCT/JP2011/002645 on May 12, 2011, now Pat. No. 8,883,068.

(30) Foreign Application Priority Data

May 28, 2010 (JP) .................. 2010-123278
Dec. 17, 2010 (JP) .................. 2010-281792

(51) Int. Cl.
C01B 32/20 (2017.01)
(52) U.S. Cl.
CPC ................. C01B 32/20 (2017.08)

(58) Field of Classification Search
CPC .................. C04B 35/522
See application file for complete search history.

(56) References Cited

U.S. PATENT DOCUMENTS 4,279,952 A 7/1981 Kodama et al.
4,954,193 A 9/1990 Murakami et al.
(Continued)

FOREIGN PATENT DOCUMENTS

CN 101687647 3/2010
CN 102803137 A 11/2012
(Continued)

OTHER PUBLICATIONS

International Search Report, International Application No. PCT/JP2011/002645, 1 pg., dated Jun. 7, 2011.
(Continued)

Primary Examiner — Matthew J Daniels
Assistant Examiner — Kimberly A. Stewart
(74) Attorney, Agent, or Firm — Kagan Binder, PLLC

(57) ABSTRACT

When a raw material graphite film bad in flatness is laminated onto another material, creases and other defects may be caused. In particular, when a graphite film having a large area is laminated, defects such as creases may be often caused. In order to solve such defects, a flatness correction treatment step is performed wherein a raw material graphite film is subjected to heat treatment up to 2000° C. or higher while a pressure is applied thereto. This flatness correction treatment gives a graphite film good in flatness. Furthermore, when the flatness of the raw material graphite film is corrected by use of a thermal expansion of a core, a graphite film small in sagging can be obtained.

19 Claims, 10 Drawing Sheets

(56) References Cited

U.S. PATENT DOCUMENTS

| | | | |
|---|---|---|---|
| 4,983,244 A | 1/1991 | Murakami et al. | |
| 5,660,541 A * | 8/1997 | Woolf | H01L 39/248 34/104 |
| 5,906,799 A | 5/1999 | Burgie et al. | |
| 2010/0062220 A1 | 3/2010 | Nishikawa | |
| 2011/0117372 A1* | 5/2011 | Suemitsu | B82Y 30/00 428/446 |
| 2011/0162792 A1 | 7/2011 | Nishikawa et al. | |
| 2011/0169180 A1* | 7/2011 | Inada | C01B 31/02 264/29.1 |
| 2012/0121880 A1 | 5/2012 | Ohta et al. | |
| 2013/0001350 A1 | 1/2013 | Ohta et al. | |
| 2013/0189180 A1 | 7/2013 | Ohta et al. | |

FOREIGN PATENT DOCUMENTS

| | | |
|---|---|---|
| CN | 102811947 A | 12/2012 |
| JP | 11-100207 | 4/1999 |
| JP | 2000-247740 | 9/2000 |
| JP | 2006-327907 | 12/2006 |
| JP | 2010-064949 | 3/2010 |
| WO | 2006/129632 | 12/2006 |

OTHER PUBLICATIONS

Search Report, CN Application No. 201180026301.6, dated Jun. 13, 2013.
English Translation of Search Report, ROC (Taiwan) Patent Application No. 100118372, dated Aug. 6, 2013.
Thermal Diffusivity Equation on Wikipedia.
Data Sheet, Sigraflex Graphite Foils.
Carbon Fibers Thermal Expansion, Pradere et al., Transverse and longitudinal coefficient of thermal expansion of carbon fibers at high temperatures (300-2500K), Aug. 7, 2008.
E-Space Abstract of CN 102803137 (1 page).
E-Space Abstract of CN 102811947 (1 page).

* cited by examiner

METHOD FOR IMPROVING THE FLATNESS OF GRAPHITE FILM, GRAPHITE FILM, AND METHOD FOR PRODUCING SAME

This application is a continuation of U.S. application Ser. No. 13/700,580, which was filed on Jan. 21, 2013, which in turn is a national stage entry of International Application No. PCT/JP2011/002645, which was filed on May 12, 2011, which in turn claims priority to Japanese Application No. 2010-281792, which was filed on Dec. 17, 2010, and Japanese Application No. 2010-123278, which was filed on May 28, 2010, wherein the entireties of said patent applications are incorporated herein by reference.

TECHNICAL FIELD

The present invention relates to a graphite film improved in flatness, a method for forming the film, and a method for improving the flatness of a graphite film.

BACKGROUND ART

Heat radiating members are used in semiconductor elements mounted on various electronic/electrical instruments, such as a computer, other heat generating members, and so on. When a graphite film, out of the heat radiating members, is used for a large-size product, the graphite film is preferably a long and large-area graphite film made from a polymeric film wound into a roll form. Thus, in order to produce this, various investigations have been made.

Suggested is, for example, a method of winding a polymeric film having a width of 250 mm and a length of 30 m around a carbonaceous cylindrical core having an outer diameter of 150 mm, and then subjecting the workpiece to heat treatment. The method makes it possible to yield a long and large-area graphite film about which the cylindrical hysteresis can easily be drawn or stretched (Patent Document 1). However, according to such a conventional method, a large sagging Zgs is unfavorably generated as shown in FIG. 1. It is impossible to restrain this sagging to produce a graphite film excellent in flatness. In such a conventional graphite film, a defect is easily generated, for example, when the film is laminated onto another sheet (see FIG. 2). Moreover, at the time of winding the graphite film onto a branch tube (see FIG. 3), and other times, an inconvenience may be caused.

PRIOR ART DOCUMENT

Patent Document

Patent Document 1: JP-A-2006-327907

DISCLOSURE OF THE INVENTION

Problems to be Solved by the Invention

An object of the present invention is to produce a graphite film excellent in flatness.

Means for Solving the Problems

Namely, the present invention relates to:
(1) a method for producing a graphite film, comprising a flatness correction treatment step of subjecting a raw material graphite film to heat treatment up to 2000° C. or higher while a pressure is applied to the raw material graphite film;
(2) the method for producing a graphite film according to (1), wherein the raw material graphite film employed in the flatness correction treatment step is a raw material graphite film caused to undergo a condition of a temperature lower than 2000° C. at least once;
(3) the method for producing a graphite film according to (1), wherein a carbonizing step and the flatness correction treatment step are included in a series of steps for producing the graphite film;
(4) the method for producing a graphite film according to any one of (1) to (3), wherein the raw material graphite film has a thermal diffusivity of 0.15 $cm^2/s$ or more in a plane direction of the film;
(5) the method for producing a graphite film according to any one of (1) to (4), wherein the flatness correction treatment step is performed to improve, into 0.2 or less, a value obtained by dividing a sagging Zgs of the graphite film in sagging evaluation described in JIS C2151 by a width Ugs thereof, Zgs/Ugs;
(6) the method for producing a graphite film according to any one of (1) to (5), wherein in the flatness correction treatment step, the raw material graphite film is subjected to the heat treatment in a state of being wound around a core;
(7) the method for producing a graphite film according to any one of (1) to (6), wherein the core has a diameter of 20 mm or more;
(8) the method for producing a graphite film according to any one of (1) to (7), wherein the core has a thermal expansion coefficient of $0.3\times10^{-6}$/K or more and $7.5\times10^{-6}$/K or less;
(9) the method for producing a graphite film according to any one of claims 1) to (8), comprising, before the flatness correction treatment step, a re-winding step of winding the raw material graphite film around a core;
(10) the method for producing a graphite film according to (9), wherein in the re-winding step, the raw material graphite film is wound and fastened with a winding fastening strength of 10 N·m/m or more;
(11) a graphite film obtained by graphitizing a carbonized polyimide film in a state that the film is wound into a roll form, wherein the graphite film has a thermal diffusivity in a plane direction of 5.0 $cm^2/s$ or more, the thickness of 7 μm or more and 120 μm or less, the width Ugs of 100 mm or more, the area of 5 $m^2$ or more, and further a value obtained by dividing a sagging Zgs in sagging evaluation described in JIS C2151 by a width Ugs, Zgs/Ugs, of 0.2 or less; and
(12) a method for correcting the flatness of a graphite film, wherein a raw material graphite film is subjected to heat treatment up to 2000° C. or higher while a pressure is applied to the raw material graphite film.

Effects of the Invention

According to the method for producing a graphite film of the present invention, a graphite film excellent in flatness is obtained.

Figure 1:
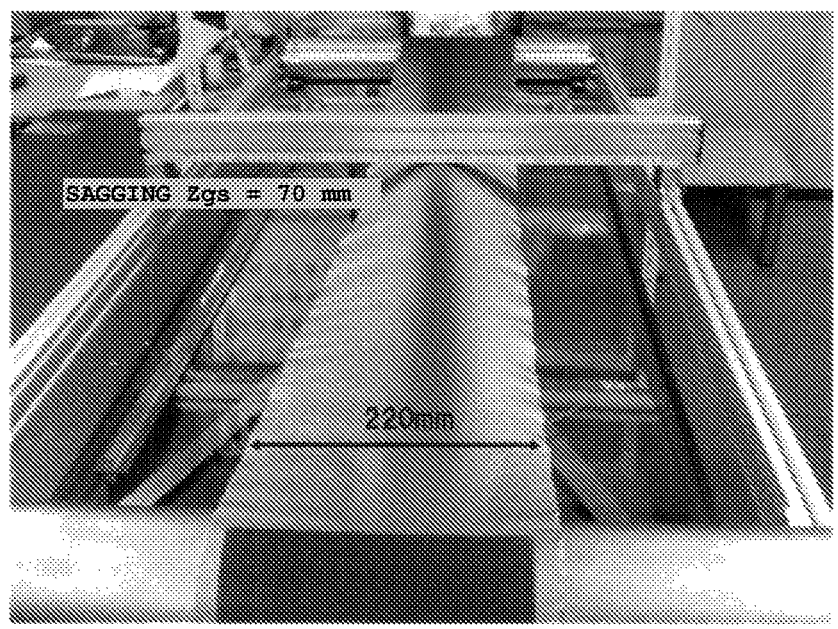
FIG. 1 shows sagging of a graphite film produced in a conventional producing method.

PREFERRED MODE FOR CARRYING OUT
THE INVENTION

The present invention relates to a method for correcting the flatness of a graphite film wherein a raw material graphite film is subjected to heat treatment up to 2000° C. or higher while a pressure is applied to the graphite film. This flatness correction method is used to make it possible to produce, from the raw material graphite film, a graphite film improved in flatness.

In the present invention, the flatness correction treatment denotes a treatment for correcting sagging to heighten the flatness thereof.

<Raw Material Graphite Film>

In the present invention, the raw material graphite film is a graphite film that is not easily changed in dimension at a temperature of 2000° C. The raw material graphite film may be, for example, a graphite film of a polymer-fired type, or a graphite film of a natural graphite type as far as the film is a graphite film as defined above. The matter that "a graphite film is not easily changed in dimension at a temperature of 2000° C." means that after the graphite film which is a raw material graphite 50 mm square is heated to 2000° C. under the application of no pressure thereto, allowed to stand still for 10 minutes and then cooled down to 23° C., the proportion of an elongation in the dimension of any one of the sides of the graphite film to the dimension (50 mm) of the side of the graphite film at 23° C. is 5% or less, preferably 3% or less, more preferably 1% or less, and even more preferably 0.5% or less. In a case where the raw material graphite film is not easily changed in dimension at the temperature of 2000° C., flatness (smoothness) can be given to the graphite film when the film is subjected to the flatness correction treatment.

The raw material graphite film of the present invention is more preferably a film that is not easily changed in dimension at a temperature of 2400° C. It is advisable that the change in the dimension of the raw material graphite film at the temperature of 2400° C. is 5% or less, preferably 3% or less, more preferably 1% or less, and even more preferably 0.5% or less. A detailed description is to be made in item "EXAMPLES" about a method for measuring a change in the dimension of any raw material graphite film at the temperature of 2400° C.

About the raw material graphite film of the present invention, the thermal diffusivity thereof in the sheet-in-plane direction thereof, which may be referred to as the plane direction, is preferably 0.15 $cm^2/s$ or more, more preferably 2.0 $cm^2/s$ or more, even more preferably 4.0 $cm^2/s$ or more, and in particular preferably 7.0 $cm^2/s$ or more.

When the thermal diffusivity of the raw material graphite film in the plane direction is 0.15 $cm^2/s$ or more, the graphitization of the film is sufficiently advanced. Thus, when subjected to heat treatment, the film is small in dimension change so that the flatness correction treatment can easily be performed. In particular, in the case of winding the raw material graphite film around a core and using a difference in thermal expansion between the core and the raw material graphite film to perform the flatness correction treatment, the raw material graphite film is easily pushed and expanded from the core when the raw material graphite film is small in dimension change. Thus, the effect of the flatness correction is easily produced. Moreover, the raw material graphite film is converted to a film which is large in strength and is soft not to be easily torn, so that a re-winding that will be described later is also to be easily performed. Furthermore, when the thermal diffusivity of the raw material graphite film in the plane direction is 0.15 $cm^2/s$ or more, thermal shift is smoothly attained in the raw material graphite film so that the flatness correction treatment can be uniformly performed.

A description is to be made in item "EXAMPLES" about a method for measuring the thermal diffusivity of each of any raw material graphite film and any graphite film.

About the raw material graphite film of the present invention, the half band width of a peak of its 002 plane is preferably 3 degrees or less, more preferably 1 degree or less, even more preferably 0.5 degrees or less, and in particular preferably 0.3 degrees or less, the half band width being according to XRD (reflection method) measurement.

When the half band width is 3 degrees or less, the graphitization is sufficiently advanced. Thus, when subjected to heat treatment, the film is small in dimension change so that the flatness correction treatment can easily be performed. In particular, in the case of winding the raw material graphite film around a core and using a difference in thermal expansion between the core and the raw material graphite film to perform the flatness correction treatment, the raw material graphite film is easily pushed and expanded from the core when the raw material graphite film is small in dimension change. Thus, the effect of the flatness correction is easily produced. Moreover, the raw material graphite film is converted to a film which is large in strength and is soft not to be easily torn, so that the re-winding, which will be described later, is also to be easily performed.

A description is to be made in item "EXAMPLES" about a method for evaluating the half band width of the 002 plane of each of any raw material graphite film and any graphite film according to the XRD (reflection method) measurement.

About the raw material graphite film of the present invention, the number of times of bending thereof in an MIT bending resistance test is preferably 100 or more, more preferably 500 or more, even more preferably 5000 or more, and in particular preferably 10000 or more.

When the number of times of bending of the raw material graphite film is 100 or more in the MIT bending resistance test, the film is a film that is large in strength and is soft not to be easily torn so that the re-winding, which will be described later, is also to be easily performed.

A description is to be made in item "EXAMPLES" about a method for evaluating each of any raw material graphite film and any graphite film in the MIT bending resistance test.

About the raw material graphite film of the present invention, the value of the sagging Zgs thereof has a correlation with the width Ugs of the raw material graphite film. If the width of the raw material graphite film is small, the sagging is small. Accordingly, in the present invention, the sagging value per width, Zgs/Ugs, of the raw material graphite film is used as an index of the flatness. About the graphite film corrected in flatness also, the value Zgs/Ugs is used as an index of the flatness.

About the raw material graphite film of the present invention, the value obtained by dividing the sagging Zgs in sagging evaluation described in JIS (Japanese Industrial Standard) C2151 "Testing Methods of Plastic Films for Electric purposes" by the width Ugs, Zgs/Ugs, is larger than 0.2, more restrictedly 0.23 or more, and in particular 0.25 or more. When the value Zgs/Ugs is larger than 0.2, the advantageous effect of the flatness correction treatment step can be expected, in particular, in a case where the raw material graphite film is bad in flatness.

After the flatness correction treatment step, it is advisable that the value Zgs/Ugs of the graphite film can be improved into 0.2 or less, preferably 0.16 or less, and even more preferably 0.11 or less. When the value Zgs/Ugs of the graphite film is 0.2 or less after the flatness correction treatment step, the film is sufficiently improved in flatness to be easily laminated onto another sheet or wound around a branch tube.

A description is to be made in item "EXAMPLES" about a method for measuring the value Zgs/Ugs of each of any raw material graphite film and any graphite film.

The flatness correction treatment may be applied to a raw material graphite film desired to be improved in flatness, or a raw material graphite film desired to be changed in shape, or the flatness correction treatment step may be added to a process for producing a graphite film.

In the present invention, it is allowable to use the raw material graphite film subjected to a temperature condition lower than 2000° C. at least once to conduct the flatness correction treatment, thereby making it possible to yield a graphite film corrected in flatness. The step of subjecting the film to a temperature condition lower than 2000° C. means the step of cooling the raw material graphite film obtained by the heat treatment once down into a temperature lower than 2000° C. When the raw material graphite film is cooled, a re-winding step, and other preparations for the flatness correction treatment can easily be performed.

<Flatness Correction Method>

In the present invention, the method for correcting the flatness (meaning that sagging (in the raw material graphite film) is corrected to heighten the flatness thereof; this meaning is the same as in the other sentences in the present specification) is a method of heating the raw material graphite film up to a temperature of 2000° C. or higher while a pressure is applied to the film, so that the raw material graphite film, which has the sagging to be poor in flatness, is improved in flatness.

The method for applying the pressure to the raw material graphite film is not particularly limited, and examples thereof include a method 1) of applying a load to the plane of the raw material graphite film, which is in a sheet form; a method 2) of pushing and expanding the raw material graphite film which is a film wound into a roll form from the inside thereof, and a method 3) of pulling the raw material graphite film.

Figure 4:
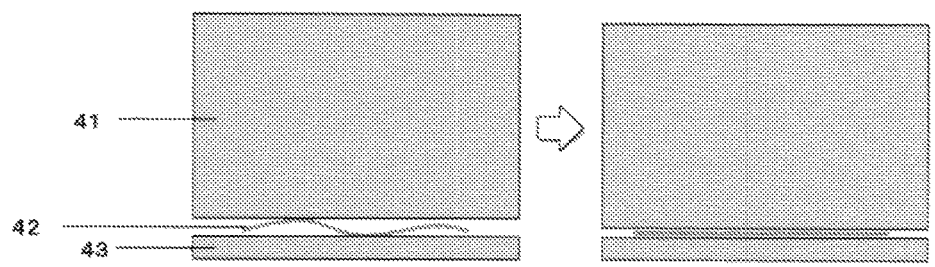
FIG. 4 shows a method for applying a load to a surface of a sheet-form raw material graphite film.

The method 1) of applying a load to the plane of the raw material graphite film, which is in a sheet form, is, for example, a method as shown in FIG. 4, in which a heavy stone is put onto the film plane, or press is performed during the heat treatment to apply a pressure thereto. In the present method, the pressure necessary for correcting the flatness is 5 g/cm$^2$ or more, preferably 50 g/cm$^2$ or more, and more preferably 100 g/cm$^2$ or more. When the pressure necessary for correcting the flatness is 5 g/cm$^2$ or more, the advantageous effect of the correction (meaning that sagging is remedied to heighten the flatness thereof; this meaning is the same as in the other sentences in the present specification) is obtained. The upper limit of the pressure needs only to be a value which does not permit the film to be broken.

Figure 16:
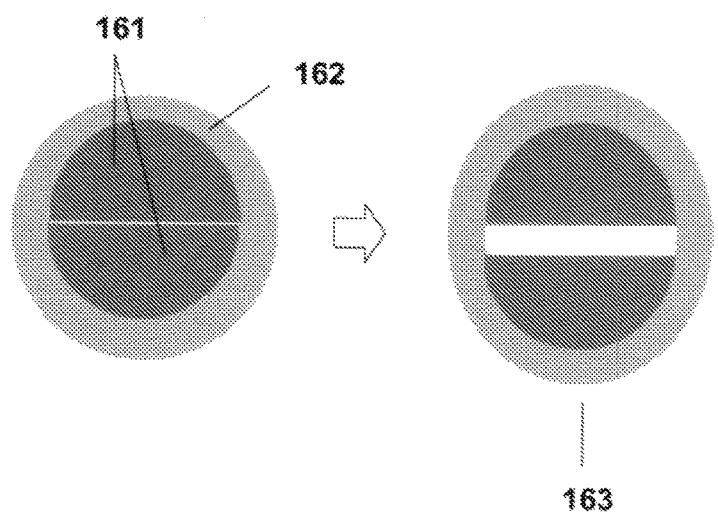
FIG. 16 shows a flatness correction treatment with a core having an expandable function.

The method 2) of pushing and expanding the raw material graphite film which is a film wound into a roll form from the inside thereof is, for example, a method of using a core having an expanding function, and winding the raw material graphite film around this core to apply a pressure to the raw material graphite film from the core. FIG. 16 shows, as an example thereof, a method of pushing and expanding a core divided into pieces outward.

In the present method, it is advisable to apply, as the pressure necessary for correcting the flatness, a pressure of 5 g/cm$^2$ or more, preferably 50 g/cm$^2$ or more, more preferably 100 g/cm$^2$ or more from the core to the inner surface of the innermost circumference of the raw material film wound around the core. When the pressure is 5 g/cm$^2$ or more, the advantageous effect of the correction is obtained. The upper limit of the pressure needs only to be a value which does not permit the film to be broken.

Figure 5:
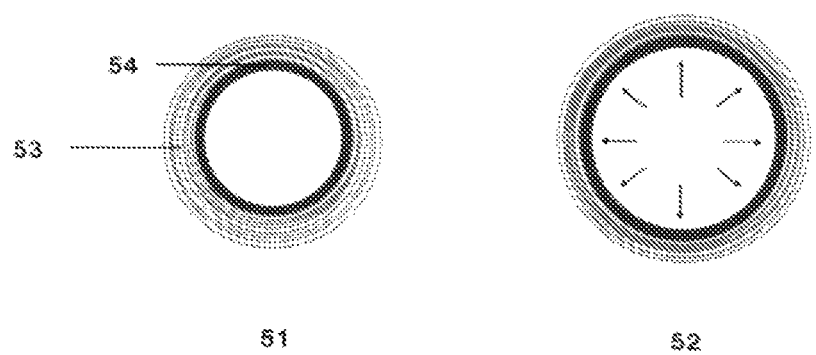
FIG. 5 shows a method for pushing and expanding a raw material graphite film by use of a thermal expansion of a core.

Another example of the present method is a method as shown in FIG. 5, wherein the thermal expansion of a core is used to push and expand the raw material graphite film. This method is preferred since the flatness correction treatment can easily be performed without locating any especial mechanism inside the furnace. About the raw material graphite film wherein graphitization is sufficiently advanced, graphite crystallites are oriented into a high degree in the plane direction so that the film is small in thermal expansion to the plane direction. Thus, when the raw material graphite film is subjected to heat treatment in the state of being wound around a core made of graphite, the film is easily pushed and expanded from the core thermally expanded. Thus, the advantageous effect of the flatness correction treatment step is large. The wind is treated preferably in the state of being wound around such a core.

In the present method, the pressure necessary for correcting the flatness cannot be measured. Thus, instead of the pressure, a requirement necessary for the correction can be specified by the winding fastening strength in the re-winding step. The winding fastening strength in the re-winding step in the present invention is 1 N·m/m or more, preferably 5 N·m/m or more, more preferably 10 N·m/m or more, even more preferably 100 N·m/m or more, and in particular preferably 200 N·m/m or more. When the winding fastening strength is 1 N·m/m or more, a sufficient pressure is applied, in the flatness correction treatment step, from the core to the inner surface of the innermost circumference of the raw material graphite film wound around the core, so that the advantageous effect of the correction is obtained. The upper limit of the winding fastening strength needs only to be a value which does not permit the film to be broken.

The flatness can be corrected by 3) subjecting the raw material graphite film to heat treatment while the film is pulled.

In this method, the pressure necessary for correcting the flatness can be determined as the tensile force applied to the film. The tensile force for correcting the flatness is 5 g/cm or more, preferably 20 g/cm or more, and more preferably 50 g/cm or more. When the tensile force is 5 g/cm or more, the advantageous effect of the correction is obtained. The upper limit of the tensile force needs only to be a value which does not permit the film to be broken.

The highest temperature necessary for correcting the flatness is 2000° C. or higher, preferably 2200° C. or higher, more preferably 2400° C. or higher, even more preferably 2600° C. or higher, even more preferably 2750° C. or higher, and in particular preferably 2800° C. or higher. When the temperature becomes 2000° C. or higher, the graphite crystallites start to be rearranged so that the raw material graphite film is easily corrected. In the case of winding the raw material graphite film around a core to perform the flatness correction treatment by use of a difference in thermal expansion between the core and this film, a large difference is generated in expansion quantity between the core and the raw material graphite film when the temperature becomes 2000° C. or higher. Thus, the raw material graphite film is easily corrected.

It is advisable that the method for producing a graphite film of the present invention includes the flatness correction treatment step. The flatness correction treatment step is a manner of applying heat and a pressure to the raw material graphite film to correct the film in flatness. The flatness correction treatment step can be accompanied by re-winding, or some other treatment.

The raw material graphite film of the present invention may be a graphite film of a polymer-fired type, or a graphite film of a natural graphite type. The polymer-fired type graphite film is better in orientation of graphite crystallites than the natural graphite type graphite film to be smaller in thermal expansion coefficient in the plane direction. Thus, for the advantageous effect produced when the raw material graphite film is wound around a core so as to be corrected, the polymer-fired type graphite film is better.

<Example of Process for Producing Graphite Film Wherein Carbonizing Step and Flatness Correction Treatment Step are Included in Series of Graphite Producing Steps>

A description is made about an example of a process for producing a graphite film wherein a carbonizing step and the flatness correction treatment step are included in a series of graphite producing steps. The method for producing a graphite film of the present invention preferably includes carbonizing step 1), graphitizing step 2) and flatness correction treatment step 3).

The carbonizing step 1) is a step of heating a polymeric film preliminarily up to at least a temperature of about 800° C., and is a step of heating the polymeric film to be decomposed, thereby yielding a carbonized film. A method for holding a polymeric film is, for example, a method of cutting this film into a sheet form, and sandwiching the film between plates or sheets to be held inside a rectangular tool; or a method of winding the polymeric film which is a long film around a core tool to be held. The tools used in these cases are each preferably a heat-resistant tool, such as a graphite member. The core around which the polymeric film is to be wound is preferably in a cylindrical form. There may be used a method of firing the polymeric film which is a film wound into a roll form while the film is re-wound around another roll.

The weight of the resultant carbonized film turns about 60% of that of the polymeric film. The film is a glassy film.

The graphitizing step 2) is a step of heating the carbonized film formed in the carbonizing step, or a polymeric film to a temperature of 1800° C. or higher to produce a raw material graphite film. The highest temperature for the graphitization is 1800° C. or higher, preferably 2000° C. or higher, more preferably 2200° C. or higher, even more preferably 2400° C. or higher, even more preferably 2600° C. or higher, and in particular preferably 2800° C. or higher. When the temperature is 1800° C. or higher, the graphitization is sufficiently advanced. Thus, in the subsequent flatness correction treatment step, the film is small in dimension change to give a raw material graphite film that can easily be improved in flatness. In particular, in the case of winding the raw material graphite film around a core to use a difference in thermal expansion between the core and this film to perform the flatness correction treatment, the film is easily pushed and expanded from the core when the film is small in dimension change. Thus, the advantageous effect of correcting the flatness is easily produced. When the temperature is 1800° C. or higher, the film is converted to a film that is large in strength and soft not to be easily torn. Thus, the re-winding operation can easily be performed.

It is allowable to conduct the carbonizing step and the graphitizing step successively, or finish the carbonizing step and subsequently conduct the graphitizing step alone.

When the flatness correction treatment step 3) is added, it is advisable to subject the raw material graphite film obtained by performing the graphitizing step to the flatness correction treatment step. It is allowable to conduct the flatness correction treatment step and the graphitizing step successively, or finish the graphitizing step and subsequently conduct the other step alone.

<Method for Subjecting Raw Material Graphite Film to Heat Treatment in the State of being Wound Around Core, and Using Thermal Expansion to Correct Flatness>

In the flatness correction treatment step of the present invention, it is preferred to use a method of subjecting a raw material graphite film to heat treatment in the state of being wound around a core. As shown in FIG. 5, in this method, the core is thermally expanded in the step of the heat treatment, so that the raw material graphite film, which is low in thermal expansion, is pushed and expanded to be corrected. This method makes it possible to yield a graphite film large in area and excellent in flatness inside a restricted space.

(About Core)

In the present invention, the shape of the core around which the raw material graphite film is to be wound is not particularly limited, and may be, for example, a columnar or polygonal-prism shape. The columnar core is particularly preferred since the core makes it possible to transmit force evenly to the raw material graphite film in the flatness correction treatment to give a good-quality graphite film.

The diameter of the core used in the present invention is 20 mm or more, preferably 50 mm or more, and more preferably 80 mm or more. When the diameter of the core is 20 mm or more, the expansion quantity of the core is sufficient so that the raw material graphite film is pushed and expanded to be corrected. Moreover, a curl of the graphite film is also small so that the film can easily be drawn and stretched.

The linear expansion coefficient (thermal expansion coefficient or thermal expansion rate) of the core used in the present invention is $0.3 \times 10^{-6}$/K or more and $7.5 \times 10^{-6}$/K or less, preferably $0.7 \times 10^{-6}$/K or more and $6.5 \times 10^{6}$/K or less, and more preferably $2.0 \times 10^{-6}$/K or more and $5.0 \times 10^{-6}$/K or less. When the linear expansion coefficient of the core is $0.3 \times 10^{-6}$/K or more, the expansion quantity of the core is sufficient so that the raw material graphite film is pushed and expanded to be corrected. When the thermal expansion coefficient of the core is $7.5 \times 10^{-6}$/K or less, it does not occur that the raw material graphite film is excessively pushed and expanded to be torn. When the linear expansion coefficient (thermal expansion coefficient) of the core is particularly $2.0 \times 10^{-6}$/K or more and $5.0 \times 10^{-6}$/K or less, the sagging of the film can be sufficiently corrected without causing any tear defect of the film.

The material of the core is preferably graphite from the viewpoint of heat resistance. Particularly preferred is an extruded product, a molded product, a CIP shaped product or some other product thereof.

(About Re-winding Step)

Figure 6:
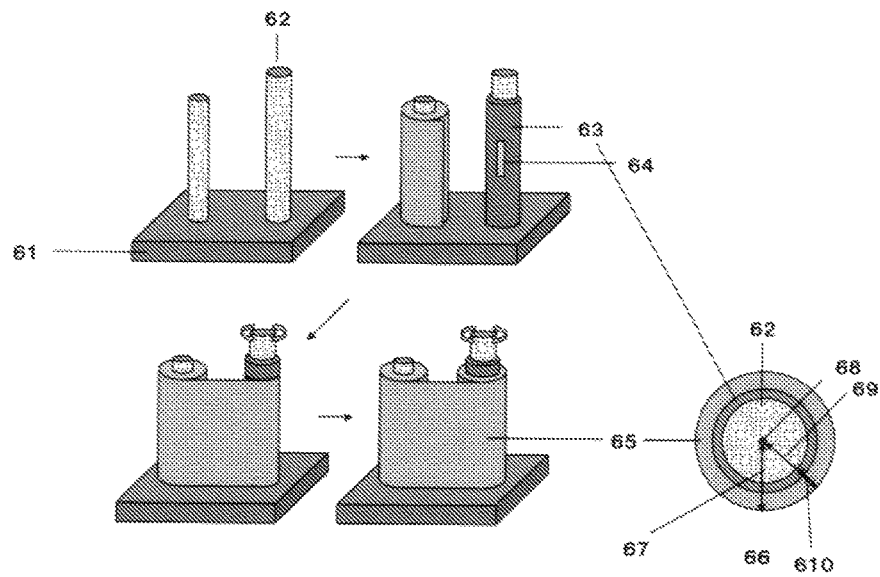
FIG. 6 shows one example of a re-winding step.

When the raw material graphite film is wound around a core to perform the flatness correction treatment step, it is preferred to wind the raw material graphite film around the core without generating loosening. It is therefore advisable that before the flatness correction treatment is performed, the method of the present invention includes a re-winding step of winding the raw material graphite film around a core. In the re-winding step, a re-winding apparatus may be used. At this time, it is preferred to wind the film so as to make edges of the film consistent with each other. In this case, at the flatness correction treatment time, force from the core can be evenly transmitted thereto. This matter does not generate, on the film, any location to which no pressure is transmitted, so that the advantageous effect of the flatness correction treatment becomes large. Use may be made of, for example, an edge position control (a controlling apparatus of making automatically an operation of making edges of the film, the so-called "ears" thereof, consistent with each other) to locate the edges evenly. It is however advisable that as shown in FIG. 6, a vertical-type re-winding apparatus is used to re-wind the film in the state of locating the edges evenly. At the time of the re-winding, a work therefor can be easily attained by fixing the core and the raw material graphite film through, for example, a double-sided adhesive tape and then starting to wind the film.

The winding fastening force in the present invention is the product of the torque of the rotary axis of the core and the radius of the outermost circumference of the roll-form raw material graphite film (see FIG. 6). The rotary axis is rotated at a predetermined torque, and in the state that the raw material graphite film is fixed to cause the outermost circumference of the film not to be moved, the film is wound and fastened until the rotation of the rotary axis stops. For example, the winding fastening force is 220 N·m/m under the following conditions: the radius 69 of the core of the raw material graphite film and the thickness 610 of the wound raw material graphite film in FIG. 6 are 50 mm and 5 mm, respectively, and the torque of the rotary axis is 4 N·m.

In the re-winding step in the present invention, the winding fastening force is 1 N·m/m or more, preferably 5 N·m/m or more, more preferably 10 N·m/m or more, even more preferably 100 N·m/m or more, and in particular preferably 200 N·m/m or more. When the winding fastening force is 1 N·m/m or more, the expanding force of the core is transmitted to the outer circumference of the wind of the raw material graphite film so that a graphite film improved in flatness is obtained. When the winding fastening force is particularly 200 N·m/m or more, the flatness can be sufficiently improved.

(About Method for Fixing Edge)

When the flatness correction treatment is conducted in the state that the raw material graphite film is wound around the core, the effect of the correction is not easily obtained if this film is unwound from the core during the heat treatment. It is therefore necessary to fix the wind in such a manner that the raw material graphite film is not unwound. For example, a heavy stone is put onto the outermost circumference of the raw material graphite film wound around the core so that the film can be caused not to be unwound. Only by laying the wound raw material graphite film laterally on the floor of the furnace, the film can be fixed not to be unwound by the self-weight thereof. The raw material graphite film may be fixed by pulling an edge of the outermost circumference of the film. Furthermore, effective is a method of restraining the film from being unwound while the pressure for fixing the film is controlled. The method for the fixing is not particularly limited as far as the method does not permit the wind to loosen or slack.

<Length and Width of Raw Material Graphite Film>

The width Ugs of the raw material graphite film in the present invention is not particularly limited; and when the producing method of the present invention is applied to a raw material graphite film bad in flatness, the flatness can be improved. When the width is in the range of 100 mm or more, further 200 mm or more, in particular 400 mm or more, the improving effect based on the flatness correction treatment can be particularly expected since the sagging of the raw material graphite film is large.

The width of the raw material graphite film denotes the length of each short side of a continuous sheet of the raw material graphite film.

The length of the raw material graphite film in the present invention is not particularly limited; and when the producing method of the present invention is applied to a raw material graphite film bad in flatness, the flatness can be improved. When the length is in the range of 1 m or more, more restrictedly 10 m or more, in particular 25 m or more, which gives a large sagging, the improving effect can be particularly expected. The length of the raw material graphite film denotes the length of each long side of the continuous sheet of the raw material graphite film.

The area of the raw material graphite film in the present invention is not particularly limited; and when the producing method of the present invention is applied to a raw material graphite film bad in flatness, the flatness can be improved. When the area is in the range of 5 $m^2$ or more, more restrictedly 10 $m^2$ or more, in particular 20 $m^2$ or more, which gives a large sagging, the improving effect can be particularly expected.

<Polymeric Film>

The polymeric film used in the present invention is not particularly limited. The film is, for example, a film of a polymer selected from the group consisting of polyimide (PI), polyamide (PA), polyoxadiazole (POD), polybenzoxazole (PBO), polybenzobisoxazole (PBBO), polythiazole (PT), polybenzothiazole (PBT), polybenzobisthiazole (PBBT), poly-p-phenylenevinylene (PPV), polybenzimidazole (PBI), and polybenzobisimidazole (PBBI). The use of at least one of these resins makes it easy to give a raw material graphite film and a graphite film excellent in crystallinity, as well as in thermal diffusivity and thermal conductivity.

<Application of Graphite Film Improved in Flatness to Article>

The graphite film of the present invention is good in flatness to be high in adhesiveness to a substrate, so that the graphite film easily gives original advantageous effects thereof. When the graphite film is used as a heat radiating sheet for an electronic instrument, heat from its heat generator can be smoothly transmitted to the graphite film. Thus, the graphite film of the present invention, which is improved in flatness, has a very high heat radiating effect.

For example, when the graphite film of the present invention is applied to an LED substrate, the temperature of the LED can easily be lowered without making the weight thereof large.

In recent years, the use of LED light sources has been increasing for lighting equipment (substitutes for fluorescent lamps or electric lamps), backlights of liquid crystal TVs (substitutes for cold cathode tubes), and others. Although LEDs are smaller in the quantity of heat generated therefrom than incandescent electric lamps and others, the LEDs are weaker against heat. Thus, if some measure against heat is taken, the LEDs are raised in temperature so that the lifetimes thereof are shortened.

At present, as substrates for LEDs, glass epoxy substrates are mainly used. However, the quantity of heat radiated therefrom is insufficient to cause a problem that the LED temperature rises. For this reason, developments have been made about substrates each having a core material that is a metallic material, such as an aluminum substrate. However, such substrates have problems of being large in weight and bad in workability.

Figure 15:
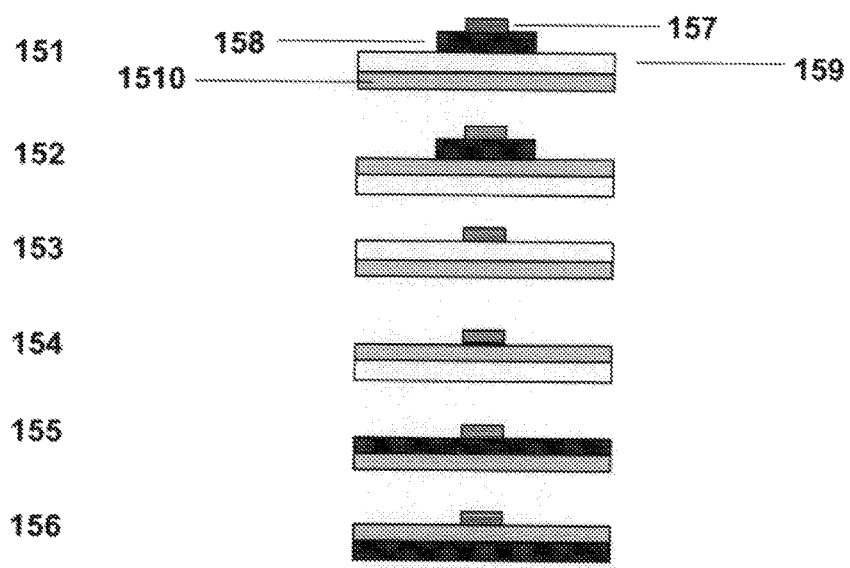
FIG. 15 shows use examples of a graphite film of the present invention.

FIG. 15 shows six manners of using-method thereof. However, the using-method is not particularly limited. For example, when manner 151 is compared with manner 152, the temperature of an LED is easily lowered in the case of using the graphite film at a position near the LED as in manner 152. When the graphite film is used in a substrate, the graphite film may be only the film, or a graphite composite product wherein the graphite film has at least one surface to which an adhesive tape or protective tape is bonded (the tape being an acrylic/silicone PET adhesive tape or a PI adhesive tape).

EXAMPLES

Hereinafter, various examples of the present invention will be described together with some comparative examples.

<Various Physical Property Measuring Conditions>

<Measurement of Sagging Zgs of Each of Raw Material Graphite Film and Graphite Film Described in JIS C2151>

For the evaluation of the flatness of each of a raw material graphite film and a graphite film, the value of the sagging thereof is measured at room temperature (23° C.) according to a sagging measurement based on the evaluation of film-capability of being wound described in JIS C2151.

(Test Piece) As each test piece, use is made of a piece obtained by pulling out a roll newly by a length of about 2 m. At this time, the test piece is sampled out from the vicinity of the center of the wind of the roll.

In other words, when the wind is a wind 100 m in length, three test pieces are sampled out from the vicinity of a position where the film is wound, by 50 m, from the end of the wind. About any sheet-form sample from which three test pieces cannot be sampled out, such as a sample of Example 14, the sample is used, as it is, as a test piece. The measurement is made only once.

Figure 9:
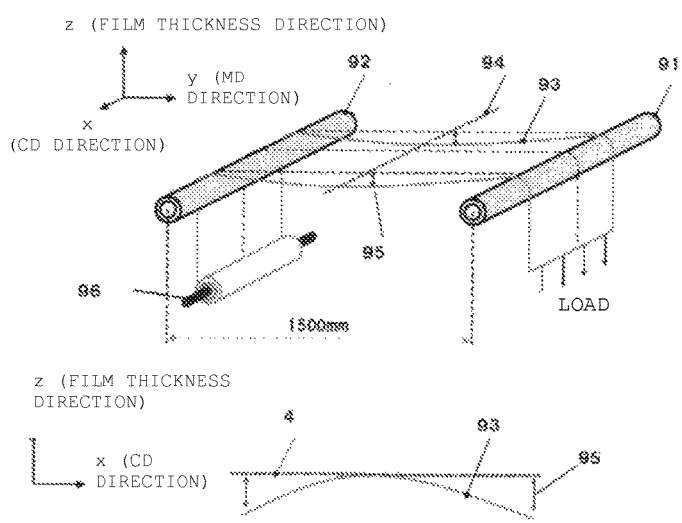
FIG. 9 is a schematic view of a sagging measurement described in JIS C2151.

(About System) A system (for the measurement) will be described hereinafter (FIG. 9).

a) About Stand to which Rolls are Attached

The system has two free-rotatable metallic rolls, and a strong stand supporting the two rolls to be parallel to each other. As each of the rolls, a roll is prepared having a diameter of 100±10 mm and a length permitting the largest width of a film to be tested to be put onto the roll. The two rolls are fixed in the state that respective axes of the rolls are on the same horizontal plane, and are parallel, within the range of an angle of 0.1 degrees or less (that is, within that of a length of 1.8 mm of per meter of the length of each of the rolls), to each other at an interval of 1500±15 mm. The rolls are each in the form of a cylinder having a cylindricity of 0.1 mm or less, and the surface thereof has been subjected to an appropriate matte finish (not polishing finish). Just below one (first roll) of the rolls, a unit (roll-putting-on/off axis) is set to the stand as indicated by 96 in FIG. 9. To the unit, the roll of the film to be tested is to be put. In this unit, 1) the roll-putting-on/off axis, to which the film is to be put, is made parallel, within the range of an angle of 1 degree or less, to the axis of the first roll, and 2) the position of the side portions of the film can freely be adjusted.

b) About Device for Applying Tensile Force to Film

At an end of the stand that is opposite thereto, a weight or a clamp with a spring can be fixed to the film that is freely hung from the other roll (second roll). The weight, or the load of the spring can be adjusted in such a manner that a weight of 50 g can be applied to each centimeter of the width of the film, and tensile force can be applied to the film as evenly as possible over the width of the film. Alternatively, the film is wound around a tension roll, and an even tensile force of 50 g per centimeter of the width may be applied thereto.

c) About Dimension Measuring Tools

Prepared are tools for making a measurement, at the center of the space between the two rolls and along a line parallel to the rolls, about the distance between the plane between the two rolls, and the film hung downward. The tools used for the measurement are a straight ruler made of steel and having a length of 1525 mm or more, and a 150-mm-long measure made of steel and having a scale marked in millimeters. Alternatively, a complicated instrument may be used which automatically or semi-automatically shows the position of the film.

(Measuring Procedure) As shown in FIG. 9, each of the test pieces is put onto the two rolls of the device so as to extend the length direction thereof over the length of the test piece. A tensile force (50 g per centimeter, as described above) is applied to the free end of the film. The position where the film is finally passed on the second roll is adjusted to make the film substantially horizontal at the center of the two rolls.

The straight steel ruler, and the scale-marked steel measure are used to check, at the center of the two rolls, the film along the width direction.

(Results) The largest sagging is defined as the sagging Zgs. The central value of the three measured values is used. About any sheet-form one out of the samples, the result obtained by measuring the sample once is described in Tables 1 to 4, and Tables 5 to 8.

<Measurement of Thermal Diffusivity in Plane Direction of Each of Raw Material Graphite Film and Graphite Film>

The thermal diffusivity in the plane direction of each of the raw material graphite film and graphite film is measured at 10 Hz in an atmosphere of 23° C. about samples thereof, which are each obtained by cutting the graphite film into a shape having a size of 4×40 mm, using a thermal diffusivity measuring device ("LaserPit", manufactured by Ulvac-Riko, Inc.) based on an optical alternating-current method. Three test pieces (as the samples) are sampled out from points 1, 2 and 3 in FIG. 11, respectively. The point 1 is a point near the center of a position where the film is wound, by 50 mm, from the innermost side of the wind of each of the raw material graphite film and graphite film, and the point 3 is a point near the center of a position where the film is wound, by 50 mm, from the outermost side thereof. The point 2 is a point middle between the points 1 and 3. The wording "point near the center" means the following: when the roll is a roll of a wind having a TD width of 200 mm, any position having a width of about 100 mm. In the same way, three test pieces are sampled out also about any sheet-form one out of the samples. The average value of the thermal diffusivities obtained by measuring the used three test pieces is described in Tables 1 to 4, and Tables 5 to 8.

<Laminate Test>

Figure 12:
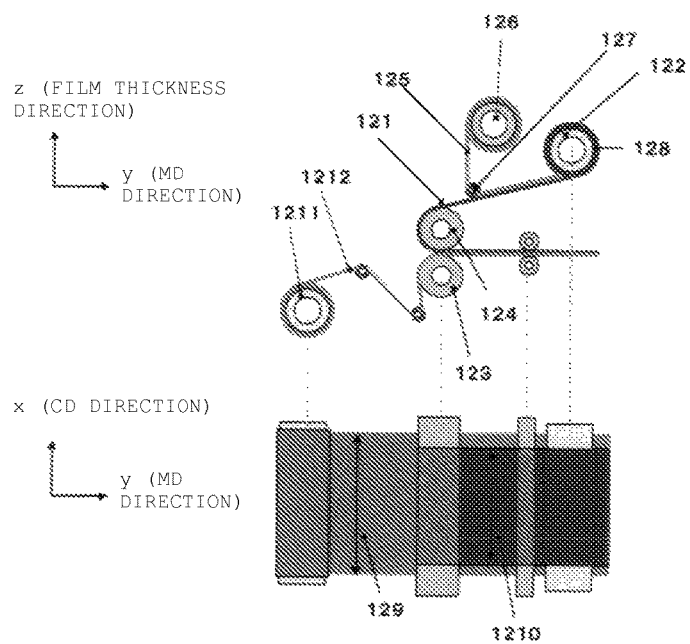
FIG. 12 is a schematic view of a laminate test.

A laminate test as shown in FIG. 12 is made. More specifically, a graphite film wound around a paper tube made of paper and having a diameter of 3 inches is continuously supplied to a space between a first roll and a second roll, which are arranged in parallel to each other and each have an outside diameter of 50 mm and a length of 635 mm, so as to bond the graphite film onto a PET tape having a thickness of 10 μm and a width 20 mm shorter than the width of the graphite film. The used PET tape is a tape to which a 633K separator available from Teraoka Seisakusho Co., Ltd. is attached. While the separator is peeled at an angle of 80 degrees, the graphite film is supplied to the second roll. The tensile force applied to the graphite film along the MD direction and the re-winding speed are set to 30 g/cm and 1 m/min, respectively. The degree of a tear in graphite film, and the degree of creases based on the bonding are evaluated.

Figure 2:
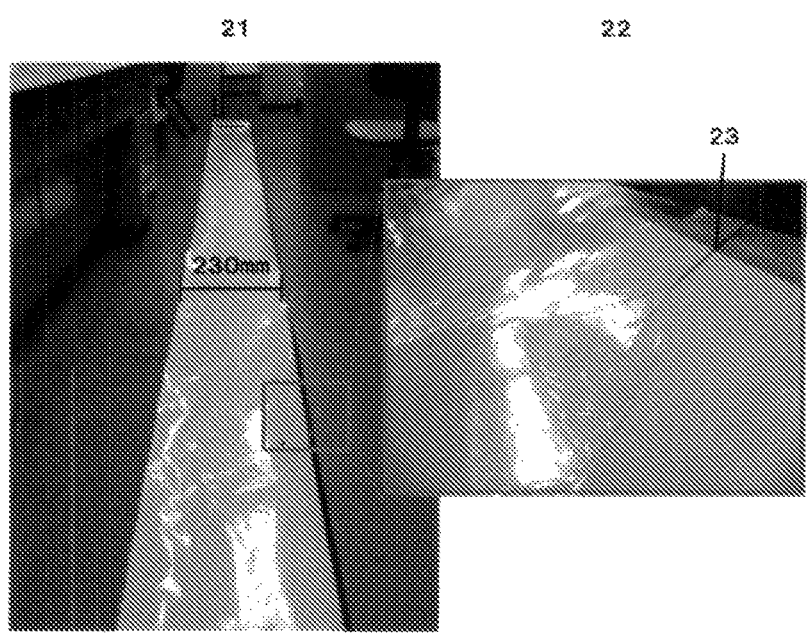
FIG. 2 shows creases based on bonding roughly through photographs.
Figure 3:
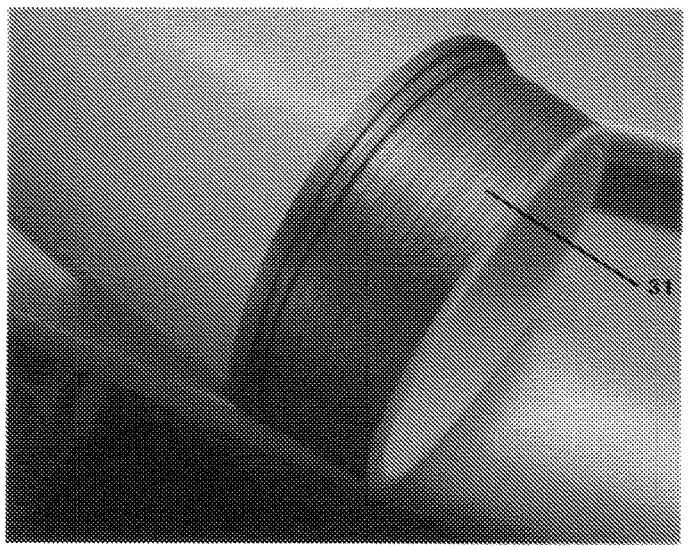
FIG. 3 shows a winding-slippage defect of a graphite film roughly through a photograph.

Creases as shown in FIG. 2 in the graphite composite film after the laminating are evaluated. Over the entire length of the composite film, the number of creases having a length of 5 mm or more is counted, and then this number is converted to the number of creases per unit length (1 m). When the number of the creases per meter is less than 0.05 per meter, the graphite film is ranked as A; when the number is 0.05 per meter or more and less than 0.2 per meter, B; when the number is 0.2 per meter or more and less than 1 per meter, C; when the number is 1 per meter or more and less than 1.5 per meter, D; when the number is 1.5 per meter or more and less than 2 per meter, E; and when the number is 2 per meter or more, F.

<MIT Bending Resistance Test of Each of Raw Material Graphite Film and Graphite Film>

An MIT bending resistance test is made about each of the raw material graphite film and graphite film. Three test pieces thereof having a size of 1.5×10 cm are sampled out from the same points 1, 2 and 3 as in FIG. 11. A Model D of an MIT folding endurance tester manufactured by Toyo Seiki Seisaku-sho, Ltd. is used to make the MIT bending resistance test under conditions that the test load is 100 gf (0.98 N), the speed is 90 times/minute, and the curvature radius R of its bending cramp is 2 mm. In an atmosphere of 23° C., within a range that the bending angle is 135 degrees into each of right and left directions, a measurement is made about the number of times of the bending (the number of times of the flection) up to a time when the film is cut. Using the three test pieces, the measurement is made. The average value is described in Tables 1 to 4, and Tables 5 to 8.

<Evaluation (Reflection XRD) of Half Band Width of Peak of 002 Plane of Each of Raw Material Graphite Film and Graphite Film>

An apparatus, RINT-2500 HL, manufactured by Rigaku Corp. is used to make an XRD measurement (X-ray diffraction) of each of the raw material graphite film and graphite film. Three test pieces thereof having a size of 25×30 mm are sampled out from the same points 1, 2 and 3 as in FIG. 11. Subsequently, each of the test pieces fixed on a holder made of aluminum is set to the apparatus to make its measuring surface consistent with a surface of the film. The current and the voltage are adjusted to 10 mA and 20 kV, respectively, and the measurement is made within the range of scanning angles from 10 to 40 degrees under conditions that the scanning speed is 4 degrees/min, and the angle of the sampling width is 0.02 degrees. Conditions for the slits are as follows: a divergent slit, a scattering slight, a light-receiving slit and a divergent vertical slit are 1 degree in angle, 1 degree in angle, 0.3 mm in length and 5 mm in length, respectively. 2θ/θ axes are controlled while the movements thereof are linked to each other. In this way, the measurement is made at the position of reflection geometry.

For analysis, the angle 2θ is represented by a transverse axis, and the cps is represented by a vertical axis thereof. The half band width of a peak of the 002 plane, about which the angle 2θ makes its appearance at about 26.5 degrees, is estimated.

Using the three test pieces, the measurement is made. The average value is described in Tables 1 to 4, and Tables 5 to 8.

<Change in Dimension of Each Raw Material Graphite Film at Temperature of 2400° C.>

A measurement is made about a change in the dimension of the raw material graphite film at a temperature of 2400° C. At 23° C., three test pieces thereof having a size of 50×50 mm are sampled from the same points 1, 2 and 3 as in FIG. 11. The test pieces are each heated to 2400° C. in the state that no pressure is applied thereto, and then allowed to stand still for 10 minutes to be cooled. After the test piece is cooled to 23° C., estimation is made about a change in the dimension of any one side of the graphite film. Using the three test pieces, the measurement is made. The average value is described in Tables 1 to 4, and Tables 5 to 8.

<Method for Measuring Area of Each of Raw Material Graphite Film and Graphite Film>

In a method for measuring the area of each of the raw material graphite film and graphite film, the area can be estimated as the product of the width of the film and a measured value of the length thereof. However, when each of the raw material graphite film and graphite film, which are each in a roll form, is strained in shape not to be easily measurable about the length thereof, or when the film is easily broken not to be easily measurable about the length thereof, the entire weight of the film is measured. From the ratio between the entire weight and the weight of a region (100×100 mm) cut out partially therefrom, the area may be calculated out.

<Measurement of Width Ugs of Each of Raw Material Graphite Film and Graphite Film>

Figure 11:
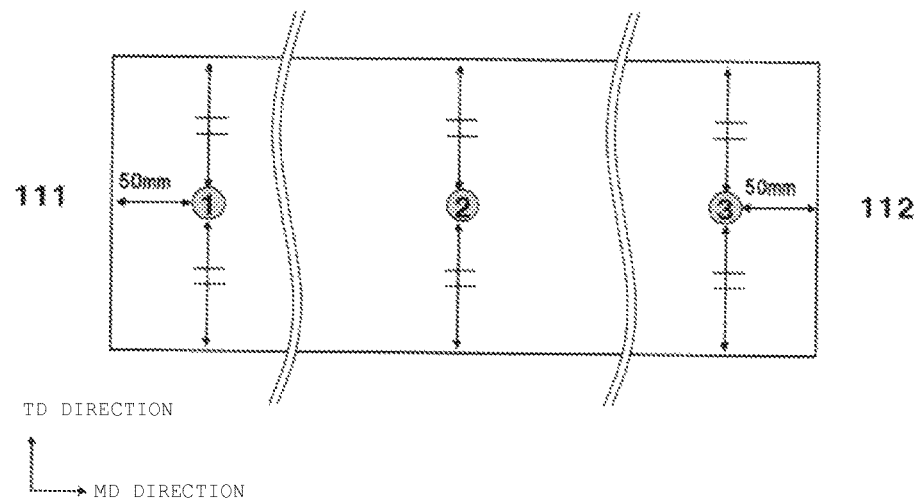
FIG. 11 shows positions of thermal diffusivity-measuring samples of a graphite film where the film are to be collected.

About the Ugs of each of the raw material graphite film and graphite film, the respective widths of the same points 1, 2 and 3 as in FIG. 11 are measured. The average thereof is shown in tables.

<Value Zgs/Ugs Obtained by Dividing Sagging Zgs of Each of Raw Material Graphite Film and Graphite Film by Width Ugs Thereof>

The value Zgs/Ugs obtained by dividing the sagging Zgs by the width Ugs is shown in Tables 1 to 4, and Tables 5 to 8.

<Measurement of Weight of Each of Raw Material Graphite Film and Graphite Film>

About the respective weights of the raw material graphite film and graphite film, the respective weights (g) of pieces 10 cm square (sampled therefrom) are measured at 23° C.

<Yield (Tear) of Graphite Film>

Figure 13:
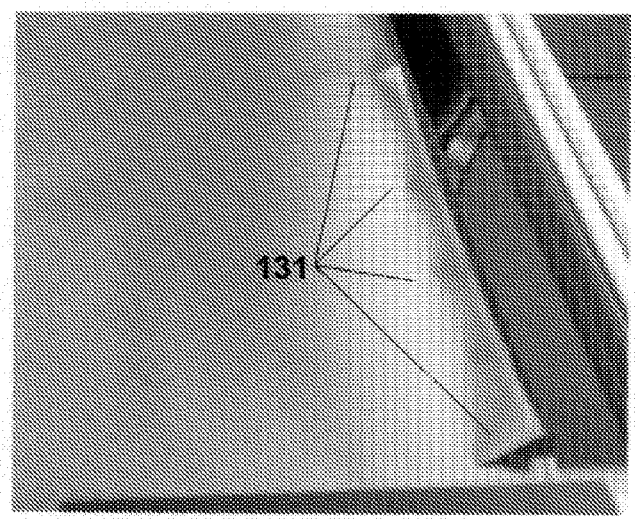
FIG. 13 shows a tear defect of a graphite film.

A description is made about a method for evaluating the yield (tear) of any graphite film. Over the entire length of the roll thereof, a count is made about tear defects as shown in FIG. 13, which each have a length of 5 mm or more and generated in respective film-regions within 30 mm (in the TD direction) of both edges. The resultant value is converted to the number of tear defects per unit length (1 m). When the number of the tear defects per m is less than 0.05 per meter, the film is ranked as A; when the number is 0.05 or more and less than 0.2 per meter, B; when the number is 0.2 or more and less than 1 per meter, C; when the number is 1 or more and less than 2 per meter, D; and when the number is 2 per meter or more, E.

<Method for Producing Polyimide Film A>

Into a solution wherein one equivalent of 4,4'-oxydianiline was dissolved in DMF (dimethylformamide) was dissolved 1 equivalent of pyromellitic dianhydride to yield a solution of polyamide acid (18.5% by weight). While this solution was cooled, thereto were added acetic anhydride and isoquinoline, each of which was 1 equivalent to carboxylic acid groups contained in the polyamide acid, and an imidization catalyst containing DMF to remove bubbles.

A mixer was used to mix the solution of polyamide acid in DMF, which was prepared in the polymerizing step, with curing agents (acetic anhydride and isoquinoline) at a predetermined ratio, and then the mixture was continuously cast and painted through a T die onto an endless belt. While the belt was rotated, the mixture was dried with hot air. By the heating, this mixed vanish underwent intramolecular dehydration so that imidization reaction was advanced. The solvent was evaporated so that the remaining amount of the solvent turned to about 46% at an outlet in a room for the belt. This film (gel film), which had a self-supporting performance, was peeled off from the belt, and fixed onto a pin frame. The workpiece was subjected to heat treatment at 300 to 580° C. in a tenter room for a total period of 4 minutes to produce a polyimide film A of 50 μm thickness. In the present examination, use was made of a polyimide film (trade name: APICAL 20AV) manufactured by Kaneka Corp., which was produced in the same way.

Example 1

Carbonizing Step

Figure 7:
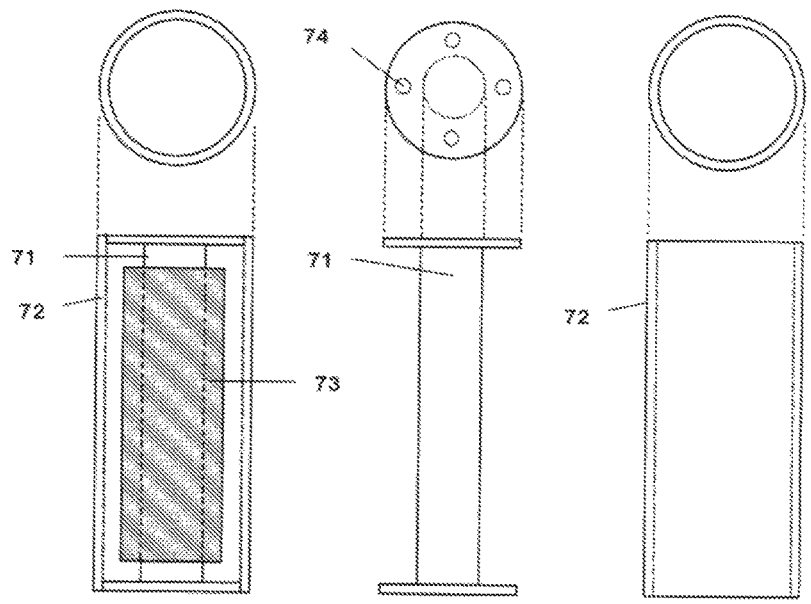
FIG. 7 shows a tool used in a carbonizing step in the present invention.

As shown in FIG. 7, the polyimide film A of 50 μm thickness, 500 mm width and 50 m length was wound around a cylindrical core having an outside diameter of 100 mm and a length of 550 mm and made of graphite, and then the resultant was covered with an outer cylinder having an inside diameter of 130 mm. This holder was laterally set in an electric furnace. The workpiece was subjected to a carbonizing step up to 1400° C. under a condition that the temperature-raising rate was 2° C./min.

Graphitizing Step

Figure 8:
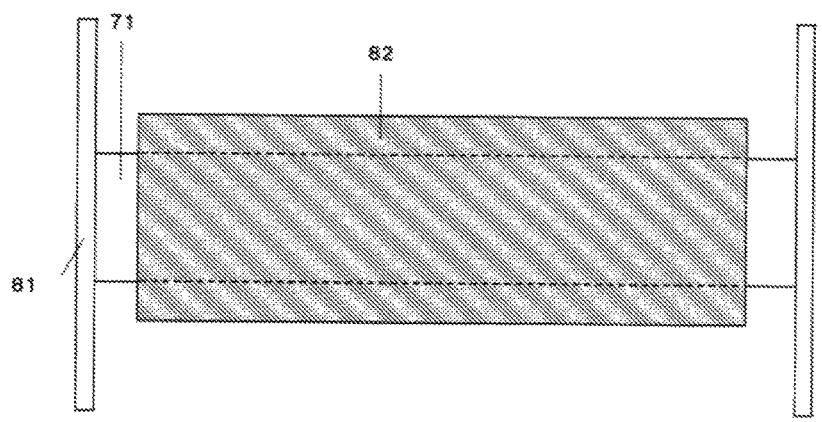
FIG. 8 shows a holder for conducting a graphitizing step when a film is laterally arranged.

Next, as shown in FIG. 8, the resultant roll-form carbonized film was laterally set inside a graphitizing furnace to be wound around a core having an outside diameter of 100 mm (the core was in the state of being floated by a support). The workpiece was subjected to a graphitizing step up to 2900° C. under a condition that the temperature-raising rate was 5° C./min. The workpiece was then cooled to room temperature. The raw material graphite film after the graphitizing step was performed was measured about the thermal diffusivity, the width Ugs, the sagging Zgs, the number of times of MIT bending, the half band width of a peak of the 002 plane according to XRD. The results are shown in Tables 1 to 4.

Re-winding Step

Next, a double sided adhesive tape was used to: bond the resultant raw material graphite film onto a core having an outside diameter of 100 mm and formed by use of a graphite member (model number: MSG, linear expansion coefficient (thermal expansion coefficient); $4.0 \times 10^{-6}$/K) available from SEC Carbon, Ltd.; fix the film onto the core; and then wind the film around the core to make the edges thereof consistent with each other as shown in FIG. 6. Thereafter, a torque of 4 N·m was applied to the driving axis so that the raw material graphite film was fixed not to move the outermost circumference of the film. Thus, the raw material graphite film was tightly wound and fastened onto the core. In this way, a re-winding step was conducted.

Flatness Correction Treatment Step

Next, the raw material graphite film wound and fastened onto the core was laterally placed and set in a graphite furnace. The workpiece was subjected to a flatness correction treatment step, which may be referred to as a correction treatment step hereinafter, up to 2900° C. under a condition that the temperature-raising rate was 5° C./min.

Various physical properties of the resultant graphite film were measured. The results are shown in Tables 1 to 4.

Example 2

The production of a graphite film was performed in the same way as in Example 1 except that the highest temperature in the flatness correction treatment step was set to 2600° C. Various physical properties of the resultant graphite film were measured. The results are shown in Tables 1 to 4.

Example 3

The production of a graphite film was performed in the same way as in Example 1 except that the highest temperature in the flatness correction treatment step was set to 2200° C. Various physical properties of the resultant graphite film were measured. The results are shown in Tables 1 to 4.

Example 4

The production of a graphite film was performed in the same way as in Example 1 except that the highest temperature in the graphitizing step was set to 2600° C. Various physical properties of the resultant graphite film were measured. The results are shown in Tables 1 to 4.

Example 5

The production of a graphite film was performed in the same way as in Example 1 except that the highest temperature in the graphitizing step was set to 2200° C. Various physical properties of the resultant graphite film were measured. The results are shown in Tables 1 to 4.

Example 6

The production of a graphite film was performed in the same way as in Example 1 except that the flatness correction treatment step was conducted in the state that the raw material graphite film was re-wound around a core having an outside diameter of 100 mm and formed by use of a graphite member (model number: NSG, linear expansion coefficient (thermal expansion coefficient); $0.7 \times 10^{-6}$/K) available from SEC Carbon, Ltd. Various physical properties of the resultant graphite film were measured. The results are shown in Tables 1 to 4.

Example 7

The production of a graphite film was performed in the same way as in Example 1 except that the flatness correction treatment step was conducted in the state that the raw material graphite film was re-wound around a core having an outside diameter of 100 mm and formed by use of a graphite member (model number: GS-203R, linear expansion coefficient (thermal expansion coefficient); $6.0 \times 10^{-6}$/K) available from Nippon Techno-Carbon Co., Ltd. Various physical properties of the resultant graphite film were measured. The results are shown in Tables 1 to 4.

Example 8

The production of a graphite film was performed in the same way as in Example 1 except that the flatness correction treatment step was conducted in the state that the raw material graphite film was re-wound around a core having an outside diameter of 30 mm. Various physical properties of the resultant graphite film were measured. The results are shown in Tables 1 to 4.

Example 9

The production of a graphite film was performed in the same way as in Example 1 except that the flatness correction treatment step was conducted in the state that the raw material graphite film was re-wound around a core having an outside diameter of 60 mm. Various physical properties of the resultant graphite film were measured. The results are shown in Tables 1 to 4.

Example 10

The production of a graphite film was performed in the same way as in Example 1 except that the re-winding step was conducted in the state that a torque of 6 N·m was applied to the driving axis. Various physical properties of the resultant graphite film were measured. The results are shown in Tables 1 to 4.

Example 11

The production of a graphite film was performed in the same way as in Example 1 except that the re-winding step was conducted in the state that a torque of 2 N·m was applied to the driving axis. Various physical properties of the resultant graphite film were measured. The results are shown in Tables 1 to 4.

Example 12

The production of a graphite film was performed in the same way as in Example 1 except that the re-winding step was conducted in the state that a torque of 0.5 N·m was applied to the driving axis. Various physical properties of the resultant graphite film were measured. The results are shown in Tables 1 to 4.

Example 13

In the same way as in Example 1 except that the polyimide film A the width and the length of which were set to 250 mm and 2 m, respectively, was put into a rectangular holder having an inner size of 250 mm×2.1 m×30 mm, a carbonizing step was performed up to 1400° C. under a condition that the temperature-raising rate was 2° C./min. In this way, a carbonized film was yielded. The yielded carbonized film was subjected to a graphitizing step up to 2900° C. under a condition that the temperature-raising rate was 5° C./min, and then cooled to room temperature.

A heavy stone was put onto the resultant raw material graphite film to apply a pressure of 6 g/cm² evenly to the film. In the same way as in Example 1, the workpiece was then subjected to a flatness correction treatment step up to 2900° C. under a condition that the temperature-raising rate was 5° C./min. Various physical properties of the resultant graphite film were measured. The results are shown in Tables 1 to 4.

Example 14

In the same way as in Example 13, a carbonizing step and a graphitizing step were performed. The resultant sheet-form raw material graphite film was subjected to a flatness correction treatment step in the same way as in Example 1. Various physical properties of the resultant graphite film were measured. The results are shown in Tables 1 to 4.

Example 15

In the same way as in Example 1, a natural graphite sheet (trade name: PERMA-FOIL (Grade name: PF), manufactured by Toyo Tanso Co., Ltd.) having a thickness of 100 μm was subjected to a flatness correction treatment step. Various physical properties of the resultant graphite film were measured. The results are shown in Tables 1 to 4.

Example 16

The production of a graphite film was performed in the same way as in Example 1 except that the highest temperature in the graphitizing step was set to 2400° C. Various physical properties of the resultant graphite film were measured. The results are shown in Tables 1 to 4.

Example 17

The production of a graphite film was performed in the same way as in Example 1 except that the highest temperature in the graphitizing step was set to 2000° C. Various physical properties of the resultant graphite film were measured. The results are shown in Tables 1 to 4.

Example 18

The production of a graphite film was performed in the same way as in Example 1 except that the highest temperature in the graphitizing step was set to 1800° C. Various physical properties of the resultant graphite film were measured. The results are shown in Tables 1 to 4.

Example 19

The production of a graphite film was performed in the same way as in Example 1 except that the highest temperature in the flatness correction treatment step was set to 2750° C. Various physical properties of the resultant graphite film were measured. The results are shown in Tables 1 to 4.

Example 20

The production of a graphite film was performed in the same way as in Example 1 except that the highest temperature in the flatness correction treatment step was set to 2400° C. Various physical properties of the resultant graphite film were measured. The results are shown in Tables 1 to 4.

Example 21

The production of a graphite film was performed in the same way as in Example 1 except that the highest temperature in the flatness correction treatment step was set to 2000° C. Various physical properties of the resultant graphite film were measured. The results are shown in Tables 1 to 4.

Example 22

In the same way as in Example 13, a carbonizing step was performed to form a carbonized film. The resultant carbonized film was set to tools in FIG. 17. As one 172 thereof, and the other 171, the following were used, respectively: a graphite member having a size of 250 mm×2.1 m×30 mm (model number: GS-203R, manufactured by Nippon Techno-Carbon Co., Ltd.; linear expansion coefficient: 6.0× $10^{-6}$/K), and a graphite outer circumferential tool having a size of 270 mm×2.1 m×51 mm×10 mm in thickness (model number: NSG, manufactured by SEC Carbon, Ltd.; linear expansion coefficient: 0.7×$10^{-6}$/K). The workpiece was subjected to a flatness correction treatment step up to 2900° C. under a condition that the temperature-raising rate was 5° C./min. Various physical properties of the resultant graphite film were measured. The results are shown in Tables 1 to 4.

Example 23

In the same way as in Example 13, a carbonizing step was performed to form a carbonized film. Without applying any load to the resultant carbonized film, the temperature of the film was raised to 2600° C. under a condition that the temperature-raising rate was 5° C./min. At a temperature of 2600° C., the film was hot-pressed to apply a pressure of 6 g/cm² onto the film. In the state that the film was kept as it was, the film was subjected to heat treatment up to 2900° C. under a condition that the temperature-raising rate was 5° C./min. Various physical properties of the resultant graphite film were measured. The results are shown in Tables 1 to 4.

Example 24

In the same way as in Example 1, a carbonizing step was performed to form a carbonized film. Next, in the same way as in Example 1, the resultant roll-form carbonized film was set into a graphitizing furnace, and then the temperature of the film was raised to 2600° C. under a condition that the temperature-raising rate was 5° C./min. At a temperature of 2600° C., the core was rotated to wind up the film, which was loosened. In the state that the film was kept as it was, the film was subjected to heat treatment up to 2900° C. under a condition that the temperature-raising rate was 5° C./min. Various physical properties of the resultant graphite film were measured. The results are shown in Tables 1 to 4.

Example 25

In the same way as in Example 1, a carbonized film was formed.

Next, the resultant roll-form carbonized film was set in a graphitizing furnace in the same way as in Example 1 except that the film was wound around the tool of 100 mm diameter in FIG. 16, which was divided into parts. The temperature of the film was raised to 2600° C. under a condition that the temperature-raising rate was 5° C./min. At a temperature of 2600° C., the core was rotated to wind up the film, which was loosened. In the state that the film was kept as it was, the film was subjected to heat treatment up to 2900° C. under a condition that the temperature-raising rate was 5° C./min. Furthermore, at 2900° C., the part-divided tool was divided and expanded to apply a pressure of 6 g/cm² to the innermost circumference of the film.

Various physical properties of the resultant graphite film were measured. The results are shown in Tables 1 to 4.

Example 26

The production of a graphite film was performed in the same way as in Example 1 except that a re-winding step was conducted in which the graphitized film was horizontally set and then re-wound around a core set horizontally in the same way and having an outside diameter of 100 mm in the state that the film was laterally kept.

Various physical properties of the resultant graphite film were measured. The results are shown in Tables 1 to 4.

Example 27

The production of a graphite film was performed in the same way as in Example 1 except that a re-winding step was conducted in which the graphitized film was horizontally set and then re-wound around a core set horizontally in the same way and having an outside diameter of 100 mm in the state that the film was laterally kept to make the edges thereof consistent with each other, using an edge position control system.

Various physical properties of the resultant graphite film were measured. The results are shown in Tables 1 to 4.

Comparative Example 1

In the same way as in Example 1, a carbonizing step and a graphitizing step were performed. Various physical properties of the resultant graphite film were measured. The results are shown in Tables 5 to 8.

Comparative Example 2

The production of a graphite film was performed in the same way as in Example 1 except that the highest temperature in the flatness correction treatment step was set to 1800° C. Various physical properties of the resultant graphite film were measured. The results are shown in Tables 5 to 8.

Comparative Example 3

In the same way as in Example 13, a carbonizing step and a graphitizing step were performed. Various physical properties of the resultant graphite film were measured. The results are shown in Tables 5 to 8.

TABLE 1

| | Polymeric film properties | | | | | Carbonizing step conditions | | |
| | | | | | | | Holder | | Highest |
| | Types | Thickness μm | Width mm | Length m | Area m² | Lengthy continuous film, or short single film | Types | Diameter mm | temperature ° C. |
|---|---|---|---|---|---|---|---|---|---|
| Example 1 | Polyimide A | 50 | 500 | 50 | 25.0 | Lengthy continuous film | Cylinder | 100 | 1400 |
| Example 2 | Polyimide A | 50 | 500 | 50 | 25.0 | Lengthy continuous film | Cylinder | 100 | 1400 |
| Example 3 | Polyimide A | 50 | 500 | 50 | 25.0 | Lengthy continuous film | Cylinder | 100 | 1400 |
| Example 4 | Polyimide A | 50 | 500 | 50 | 25.0 | Lengthy continuous film | Cylinder | 100 | 1400 |
| Example 5 | Polyimide A | 50 | 500 | 50 | 25.0 | Lengthy continuous film | Cylinder | 100 | 1400 |
| Example 6 | Polyimide A | 50 | 500 | 50 | 25.0 | Lengthy continuous film | Cylinder | 100 | 1400 |
| Example 7 | Polyimide A | 50 | 500 | 50 | 25.0 | Lengthy continuous film | Cylinder | 100 | 1400 |
| Example 8 | Polyimide A | 50 | 500 | 50 | 25.0 | Lengthy continuous film | Cylinder | 100 | 1400 |
| Example 9 | Polyimide A | 50 | 500 | 50 | 25.0 | Lengthy continuous film | Cylinder | 100 | 1400 |
| Example 10 | Polyimide A | 50 | 500 | 50 | 25.0 | Lengthy continuous film | Cylinder | 100 | 1400 |
| Example 11 | Polyimide A | 50 | 500 | 50 | 25.0 | Lengthy continuous film | Cylinder | 100 | 1400 |
| Example 12 | Polyimide A | 50 | 500 | 50 | 25.0 | Lengthy continuous film | Cylinder | 100 | 1400 |
| Example 13 | Polyimide A | 50 | 250 | 2 | 0.5 | Short single film | Free | 100 | 1400 |
| Example 14 | Polyimide A | 50 | 250 | 2 | 0.5 | Short single film | Free | 100 | 1400 |
| Example 15 | Natural graphite sheet (thickness: 100 μm) | | | | | | | | |
| Example 16 | Polyimide A | 50 | 500 | 50 | 25.0 | Lengthy continuous film | Cylinder | 100 | 1400 |
| Example 17 | Polyimide A | 50 | 500 | 50 | 25.0 | Lengthy continuous film | Cylinder | 100 | 1400 |
| Example 18 | Polyimide A | 50 | 500 | 50 | 25.0 | Lengthy continuous film | Cylinder | 100 | 1400 |
| Example 19 | Polyimide A | 50 | 500 | 50 | 25.0 | Lengthy continuous film | Cylinder | 100 | 1400 |
| Example 20 | Polyimide A | 50 | 500 | 50 | 25.0 | Lengthy continuous film | Cylinder | 100 | 1400 |
| Example 21 | Polyimide A | 50 | 500 | 50 | 25.0 | Lengthy continuous film | Cylinder | 100 | 1400 |
| Example 22 | Polyimide A | 50 | 250 | 2 | 0.5 | Short single film | Free | 100 | 1400 |
| Example 23 | Polyimide A | 50 | 250 | 2 | 0.5 | Short single film | Free | 100 | 1400 |
| Example 24 | Polyimide A | 50 | 500 | 50 | 25.0 | Lengthy continuous film | Cylinder | 100 | 1400 |
| Example 25 | Polyimide A | 50 | 500 | 50 | 25.0 | Lengthy continuous film | Cylinder | 100 | 1400 |
| Example 26 | Polyimide A | 50 | 500 | 50 | 25.0 | Lengthy continuous film | Cylinder | 100 | 1400 |
| Example 27 | Polyimide A | 50 | 500 | 50 | 25.0 | Lengthy continuous film | Cylinder | 100 | 1400 |

TABLE 2

| | Graphitizing step conditions, and properties of resultant raw material graphite film | | | | | | | | | | | |
| | Lengthy continuous film, or short single film | Holder | | Highest temperature ° C. | Thermal diffusivity cm²/s | Length m | Width Ugs mm | Sagging Zgs mm | Zgs/Dgs | Dimension change (%) | MIT Times | Half band width of XRD (002) Degrees |
| | | Types | Diameter mm | | | | | | | | | |
|---|---|---|---|---|---|---|---|---|---|---|---|---|
| Example 1 | Lengthy continuous film | Cylinder | 100 | 2900 | 8.300 | 45 | 450 | 120 | 0.267 | 0.0 | >10000 | 0.154 |
| Example 2 | Lengthy continuous film | Cylinder | 100 | 2900 | 8.300 | 45 | 450 | 120 | 0.267 | 0.0 | >10000 | 0.154 |
| Example 3 | Lengthy continuous film | Cylinder | 100 | 2900 | 8.300 | 45 | 450 | 120 | 0.267 | 0.0 | >10000 | 0.154 |
| Example 4 | Lengthy continuous film | Cylinder | 100 | 2600 | 4.000 | 44 | 440 | 100 | 0.227 | 0.0 | 6329 | 0.168 |
| Example 5 | Lengthy continuous film | Cylinder | 100 | 2200 | 0.180 | 43 | 425 | 90 | 0.212 | 2.5 | 542 | 0.887 |
| Example 6 | Lengthy continuous film | Cylinder | 100 | 2900 | 8.300 | 45 | 450 | 120 | 0.267 | 0.0 | >10000 | 0.154 |
| Example 7 | Lengthy continuous film | Cylinder | 100 | 2900 | 8.300 | 45 | 450 | 120 | 0.267 | 0.0 | >10000 | 0.154 |
| Example 8 | Lengthy continuous film | Cylinder | 100 | 2900 | 8.300 | 45 | 450 | 120 | 0.267 | 0.0 | >10000 | 0.154 |
| Example 9 | Lengthy continuous film | Cylinder | 100 | 2900 | 8.300 | 45 | 450 | 120 | 0.267 | 0.0 | >10000 | 0.154 |
| Example 10 | Lengthy continuous film | Cylinder | 100 | 2900 | 8.300 | 45 | 450 | 120 | 0.267 | 0.0 | >10000 | 0.154 |

TABLE 2-continued

Graphitizing step conditions, and properties of resultant raw material graphite film

Figure 17:
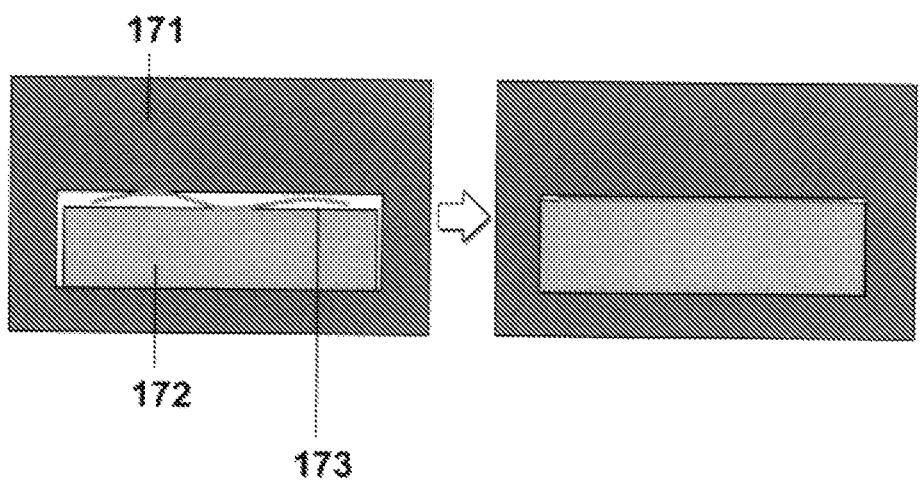
FIG. 17 shows a tool for correcting a sheet-form film by a thermal expansion difference.

| | Lengthy continuous film, or short single film | Holder Types | Holder Diameter mm | Highest temperature °C | Thermal diffusivity cm²/s | Width Length m | Sagging Ugs mm | Dimension Zgs mm | Zgs/Dgs | change (%) | MIT Times | Half band width of XRD (002) Degrees |
|---|---|---|---|---|---|---|---|---|---|---|---|---|
| Example 11 | Lengthy continuous film | Cylinder | 100 | 2900 | 8.300 | 45 | 450 | 120 | 0.267 | 0.0 | >10000 | 0.154 |
| Example 12 | Lengthy continuous film | Cylinder | 100 | 2900 | 8.300 | 45 | 450 | 120 | 0.267 | 0.0 | >10000 | 0.154 |
| Example 13 | Short single film | Free | 100 | 2900 | 8.300 | 2 | 225 | 70 | 0.311 | 0.0 | >10000 | 0.154 |
| Example 14 | Short single film | Free | 100 | 2900 | 8.300 | 2 | 225 | 70 | 0.311 | 0.0 | >10000 | 0.154 |
| Example 15 | Natural graphite sheet (thickness: 100 μm) | | | | 2.500 | 45 | 450 | 100 | 0.222 | 0.0 | 329 | 0.282 |
| Example 16 | Lengthy continuous film | Cylinder | 100 | 2400 | 2.000 | 44 | 435 | 95 | 0.218 | 0.0 | 5003 | 0.328 |
| Example 17 | Lengthy continuous film | Cylinder | 100 | 2000 | <0.1 | 41 | 410 | 90 | 0.220 | 5.1 | <100 | >1.000 |
| Example 18 | Lengthy continuous film | Cylinder | 100 | 1800 | <0.1 | 40 | 402 | Not measurable | Not measurable | 6.7 | <10 | >1.000 |
| Example 19 | Lengthy continuous film | Cylinder | 100 | 2900 | 8.300 | 45 | 450 | 120 | 0.267 | 0.0 | >10000 | 0.154 |
| Example 20 | Lengthy continuous film | Cylinder | 100 | 2900 | 8.300 | 45 | 450 | 120 | 0.267 | 0.0 | >10000 | 0.154 |
| Example 21 | Lengthy continuous film | Cylinder | 100 | 2900 | 8.300 | 45 | 450 | 120 | 0.267 | 0.0 | >10000 | 0.154 |
| Example 22 | Carbonized film was set in holder in FIG. 17; and in the state, temperature thereof was raised to 2900° C. |
| Example 23 | Film was pressed by use of hot press. → In the state, temperature was raised to 2900° C.; pressing load: 6 g/cm² |
| Example 24 | Cylindrical holder was rotated at 2600° C. to wind and fasten film onto core. → Temperature was raised to 2900° C. |
| Example 25 | Part-divided cylindrical holder 100 mm in diameter in FIG. 16; core was divided and expanded at 2900° C. |
| Example 26 | Lengthy continuous film | Cylinder | 100 | 2900 | 8.300 | 45 | 450 | 120 | 0.267 | 0.0 | >10000 | 0.154 |
| Example 27 | Lengthy continuous film | Cylinder | 100 | 2900 | 8.300 | 45 | 450 | 120 | 0.267 | 0.0 | >10000 | 0.154 |

TABLE 3

| | Re-winding conditions | | | Correction treatment step conditions | | | | | | | |
|---|---|---|---|---|---|---|---|---|---|---|---|
| | Winding Torque N·m | fastening force N·m/m | Vertically wound, or laterally wound | Lengthy continuous film, or short single film | Holder Types | Holder Material | Linear expansion ×10⁻⁶/K | Diameter mm | Starting temperature °C | Highest temperature °C | Vertically placed, or laterally placed |
| Example 1 | 4 | 220 | Vertically wound | Lengthy continuous film | Cylinder | MSG | 4.00 | 100 | 23 | 2900 | Laterally |
| Example 2 | 4 | 220 | Vertically wound | Lengthy continuous film | Cylinder | MSG | 4.00 | 100 | 23 | 2600 | Laterally |
| Example 3 | 4 | 220 | Vertically wound | Lengthy continuous film | Cylinder | MSG | 4.00 | 100 | 23 | 2200 | Laterally |
| Example 4 | 4 | 220 | Vertically wound | Lengthy continuous film | Cylinder | MSG | 4.00 | 100 | 23 | 2900 | Laterally |
| Example 5 | 4 | 220 | Vertically wound | Lengthy continuous film | Cylinder | MSG | 4.00 | 100 | 23 | 2900 | Laterally |
| Example 6 | 4 | 220 | Vertically wound | Lengthy continuous film | Cylinder | MSG | 0.70 | 100 | 23 | 2900 | Laterally |
| Example 7 | 4 | 220 | Vertically wound | Lengthy continuous film | Cylinder | GS203R | 6.00 | 100 | 23 | 2900 | Laterally |

TABLE 3-continued

| | Re-winding conditions | | | Correction treatment step conditions | | | | | | | |
|---|---|---|---|---|---|---|---|---|---|---|---|
| | | | | | Holder | | | | Starting | Highest | Vertically |
| | | Winding fastening force N · m/m | Vertically wound, or laterally wound | Lengthy continuous film, or short single film | Types | Material | Linear expansion ×10⁻⁶/K | Diameter mm | temperature ° C. | temperature ° C. | placed, or laterally placed |
| | Torque N · m | | | | | | | | | | |
| Example 8 | 4 | 220 | Vertically wound | Lengthy continuous film | Cylinder | MSG | 4.00 | 30 | 23 | 2900 | Laterally |
| Example 9 | 4 | 220 | Vertically wound | Lengthy continuous film | Cylinder | MSG | 4.00 | 60 | 23 | 2900 | Laterally |
| Example 10 | 6 | 330 | Vertically wound | Lengthy continuous film | Cylinder | MSG | 4.00 | 100 | 23 | 2900 | Laterally |
| Example 11 | 2 | 110 | Vertically wound | Lengthy continuous film | Cylinder | MSG | 4.00 | 100 | 23 | 2900 | Laterally |
| Example 12 | 0.5 | 27.5 | Vertically wound | Lengthy continuous film | Cylinder | MSG | 4.00 | 100 | 23 | 2900 | Laterally |
| Example 13 | — | — | — | Short single film | Load applied to film: 6 g/cm² | | | | 23 | 2900 | Laterally |
| Example 14 | 4 | 200 | Vertically wound | Lengthy continuous film | Cylinder | MSG | 4.00 | 100 | 23 | 2900 | Laterally |
| Example 15 | 4 | 200 | Vertically wound | Lengthy continuous film | Cylinder | MSG | 4.00 | 100 | 23 | 2900 | Laterally |
| Example 16 | 4 | 220 | Vertically wound | Lengthy continuous film | Cylinder | MSG | 4.00 | 100 | 23 | 2900 | Laterally |
| Example 17 | 4 | 220 | Vertically wound | Lengthy continuous film | Cylinder | MSG | 4.00 | 100 | 23 | 2900 | Laterally |
| Example 18 | 4 | 220 | Vertically wound | Lengthy continuous film | Cylinder | MSG | 4.00 | 100 | 23 | 2900 | Laterally |
| Example 19 | 4 | 220 | Vertically wound | Lengthy continuous film | Cylinder | MSG | 4.00 | 100 | 23 | 2750 | Laterally |
| Example 20 | 4 | 220 | Vertically wound | Lengthy continuous film | Cylinder | MSG | 4.00 | 100 | 23 | 2400 | Laterally |
| Example 21 | 4 | 220 | Vertically wound | Lengthy continuous film | Cylinder | MSG | 4.00 | 100 | 23 | 2000 | Laterally |
| Example 22 | In graphitizing step, correction treatment was conducted. | | | | | | | | | | |
| Example 23 | In graphitizing step, correction treatment was conducted. | | | | | | | | | | |
| Example 24 | In graphitizing step, correction treatment was conducted. | | | | | | | | | | |
| Example 25 | In graphitizing step, correction treatment was conducted. | | | | | | | | | | |
| Example 26 | 4 | 220 | Laterally wound | Lengthy continuous film | Cylinder | MSG | 4.00 | 100 | 23 | 2900 | Laterally |
| Example 27 | 4 | 220 | Laterally wound (EPC) | Lengthy continuous film | Cylinder | MSG | 4.00 | 100 | 23 | 2900 | Laterally |

TABLE 4

| | Graphite film properties | | | | | | | | | |
|---|---|---|---|---|---|---|---|---|---|---|
| | Length m | Width Ugs mm | Area m² | Sagging Zgs mm | Zgs/Ugs | Yield (tear) | Laminate test | MIT Times | Thermal diffusivity cm²/s | Half band width of XRD (002) Degrees |
| Example 1 | 45 | 450 | 20.25 | 35 | 0.078 | A | A | >10000 | 8.5 | 0.154 |
| Example 2 | 45 | 450 | 20.25 | 45 | 0.100 | A | B | >10000 | 8.4 | 0.154 |
| Example 3 | 45 | 450 | 20.25 | 60 | 0.133 | A | C | >10000 | 8.3 | 0.154 |
| Example 4 | 45 | 450 | 20.25 | 35 | 0.078 | C | A | >10000 | 8.3 | 0.154 |
| Example 5 | 45 | 450 | 20.25 | 60 | 0.133 | B | C | >10000 | 8.3 | 0.154 |
| Example 6 | 45 | 450 | 20.25 | 45 | 0.100 | A | B | >10000 | 8.4 | 0.154 |
| Example 7 | 45 | 450 | 20.25 | 25 | 0.056 | B | A | >10000 | 8.6 | 0.154 |
| Example 8 | 45 | 450 | 20.25 | 55 | 0.122 | A | C | >10000 | 8.4 | 0.154 |
| Example 9 | 45 | 450 | 20.25 | 45 | 0.100 | A | B | >10000 | 8.4 | 0.154 |
| Example 10 | 45 | 450 | 20.25 | 30 | 0.067 | B | A | >10000 | 8.3 | 0.154 |
| Example 11 | 45 | 450 | 20.25 | 45 | 0.100 | A | B | >10000 | 8.3 | 0.154 |
| Example 12 | 45 | 450 | 20.25 | 55 | 0.122 | A | C | >10000 | 8.3 | 0.154 |
| Example 13 | 2 | 225 | 0.405 | 25 | 0.111 | A | A | >10000 | 8.4 | 0.154 |
| Example 14 | 2 | 225 | 0.405 | 20 | 0.089 | A | A | >10000 | 8.4 | 0.154 |
| Example 15 | 45 | 450 | 20.25 | 50 | 0.111 | A | B | 388 | 2.5 | 0.282 |
| Example 16 | 45 | 450 | 20.25 | 70 | 0.156 | C | C | >10000 | 8.5 | 0.154 |
| Example 17 | 45 | 450 | 20.25 | 80 | 0.178 | B | D | >10000 | 8.5 | 0.154 |
| Example 18 | 45 | 450 | 20.25 | 90 | 0.200 | B | D | >10000 | 8.5 | 0.154 |

TABLE 4-continued

| | | | | Graphite film properties | | | | | | |
|---|---|---|---|---|---|---|---|---|---|---|
| | Length m | Width Ugs mm | Area m² | Sagging Zgs mm | Zgs/Ugs | Yield (tear) | Laminate test | MIT Times | Thermal diffusivity cm²/s | Half band width of XRD (002) Degrees |
| Example 19 | 45 | 450 | 20.25 | 40 | 0.089 | A | B | >10000 | 8.5 | 0.154 |
| Example 20 | 45 | 450 | 20.25 | 50 | 0.111 | A | C | >10000 | 8.5 | 0.154 |
| Example 21 | 45 | 450 | 20.25 | 65 | 0.144 | A | D | >10000 | 8.5 | 0.154 |
| Example 22 | 2 | 225 | 0.405 | 30 | 0.133 | A | A | >10000 | 8.4 | 0.154 |
| Example 23 | 2 | 225 | 0.405 | 30 | 0.133 | A | A | >10000 | 8.4 | 0.154 |
| Example 24 | 45 | 450 | 20.25 | 55 | 0.122 | A | C | >10000 | 8.5 | 0.154 |
| Example 25 | 45 | 450 | 20.25 | 45 | 0.100 | A | B | >10000 | 8.5 | 0.154 |
| Example 26 | 45 | 450 | 20.25 | 40 | 0.089 | C | A | >10000 | 8.5 | 0.154 |
| Example 27 | 45 | 450 | 20.25 | 35 | 0.078 | A | A | >10000 | 8.5 | 0.154 |

TABLE 5

| | Polymeric film properties | | | | Lengthy continuous film, or short single film | Carbonizing step conditions | | |
|---|---|---|---|---|---|---|---|---|
| | | | | | | Holder | | Highest |
| | Types | Thickness μm | Width mm | Length m | Area m² | | Types | Diameter mm | temperature ° C. |
| Comparative Example 1 | Polyimide A | 50 | 500 | 50 | 25.0 | Lengthy continuous film | Cylinder | 100 | 1400 |
| Comparative Example 2 | Polyimide A | 50 | 500 | 50 | 25.0 | Lengthy continuous film | Cylinder | 100 | 1400 |
| Comparative Example 3 | Polyimide A | 50 | 250 | 2 | 0.5 | Short single film | Free | 100 | 1400 |

TABLE 6

| | Graphitizing step conditions, and properties of resultant raw material graphite film | | | | | | | | | | | |
|---|---|---|---|---|---|---|---|---|---|---|---|---|
| | Lengthy continuous film, or short single film | Holder | | Highest temperature ° C. | Thermal diffusivity cm²/s | Length m | Width Ugs mm | Sagging Zgs mm | Zgs/Ugs | Dimension change (%) | MIT Times | Half band width of XRD (002) Degrees |
| | | Types | Diameter mm | | | | | | | | | |
| Comparative Example 1 | Lengthy continuous film | Cylinder | 100 | 2900 | 8.300 | 45 | 450 | 120 | 0.267 | 0.0 | >10000 | 0.154 |
| Comparative Example 2 | Lengthy continuous film | Cylinder | 100 | 2900 | 8.300 | 45 | 450 | 120 | 0.267 | 0.0 | >10000 | 0.154 |
| Comparative Example 3 | Short single film | Free | 100 | 2900 | 8.300 | 2 | 225 | 70 | 0.311 | 0.0 | >10000 | 0.154 |

TABLE 7

| | Re-winding conditions | | | Correction treatment step conditions | | | | | | |
|---|---|---|---|---|---|---|---|---|---|---|
| | Winding Torque N·m | Vertically fastening force N·m/m | wound, or laterally wound | Lengthy continuous film, or short single film | Holder | | | | Starting temperature ° C. | Highest temperature ° C. | Vertically placed, or laterally placed |
| | | | | | types | Material | Linear expansion ×10⁻⁶/K | Diameter mm | | | |
| Comparative Example 1 | | | | | | | Not performed | | | | |
| Comparative Example 2 | 4 | 200 | Vertically wound | Lengthy continuous film | Cylinder | MSG | 4.00 | 100 | 23 | 1800 | Laterally |

TABLE 7-continued

| | Re-winding conditions | | | Correction treatment step conditions | | | | | | |
|---|---|---|---|---|---|---|---|---|---|---|
| | Torque N·m | Winding fastening force N·m/m | Vertically wound, or laterally wound | Lengthy continuous film, or short single film | Holder types | Material | Linear expansion ×10⁻⁶/K | Diameter mm | Starting temperature °C | Highest temperature °C | Vertically placed, or laterally placed |
| Comparative Example 3 | | | | | Not performed | | | | | | |

TABLE 8

| | Graphite film properties | | | | | | | | | |
|---|---|---|---|---|---|---|---|---|---|---|
| | Length m | Width Ugs mm | Area m² | Sagging Zgs mm | Zgs/Ugs | Yield (tear) | Laminate test | MIT Times | Thermal diffusivity cm²/s | Half band width of XRD (002) Degrees |
| Comparative Example 1 | 45 | 450 | 20.25 | 120 | 0.267 | A | E | >10000 | 8.3 | 0.154 |
| Comparative Example 2 | 45 | 450 | 20.25 | 100 | 0.222 | A | E | >10000 | 8.3 | 0.154 |
| Comparative Example 3 | 2 | 225 | 0.405 | 70 | 0.311 | A | E | >10000 | 8.3 | 0.154 |

<Advantageous Effects of Flatness Correction Treatment Step>

Figure 14:
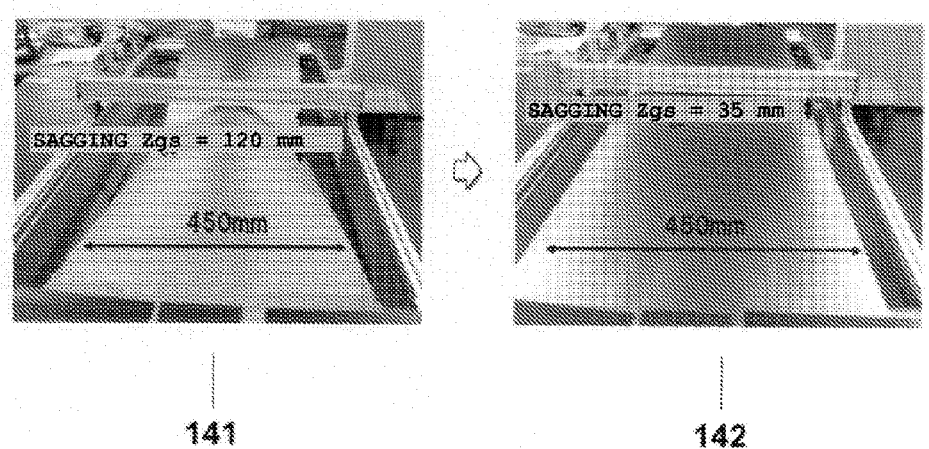
FIG. 14 shows each sagging of a graphite film before and after a flatness correction treatment in Example 1.

As shown in Tables 1 to 4, Examples 1 to 27, wherein the flatness correction treatment step was performed, each had a value Zgs/Ugs of 0.2 or less to be far batter in flatness than Comparative Example 1 and 3, wherein no flatness correction treatment step was performed. This is because by giving a temperature again to the raw material graphite films bad in flatness while the load was applied thereto, graphite crystallites were rearranged so that the sagging of the films was corrected. The value Zgs/Ugs was reduced to 0.2 or less although before the flatness correction treatment in Examples 1 to 27 the value Zgs/Ugs was larger than 0.2. Thus, the sagging was able to be drastically improved. For example, in FIG. 14 is shown photographs that roughly show the graphitized raw material graphite film of Example 1 and the graphite film subjected to the flatness correction treatment.

In each of Examples 1 to 12, 14 to 21, 24, 26 and 27, by a difference in thermal expansion between the core and the raw material graphite film wound around the core, the raw material graphite film was pushed and expanded outward by the core in the heat treatment step, whereby the sagging of the graphite film was corrected. In Example 13, the heavy stone was put so that the load was applied evenly in the plane direction in the heat treatment so that the sagging was corrected. Moreover, by the pressure in the plane direction that was applied in the flatness correction treatment, the raw material graphite film was improved in surface property also, so that the resultant graphite film had no unevenness to be very uniform. In Example 22, the graphite members different in thermal expansion coefficient were combined with each other so that a pressure was applied to the raw material graphite film in the heat treatment step by the thermal expansion difference. In this way, the sagging was corrected. In Example 23, the carbonized film was hot-pressed at 2600° C. or a higher temperature so that the sagging of the film was corrected. In Example 25, by the division and expansion of the core, the film was pushed and expanded outward from the core. Moreover, the pressure in the plane direction that was applied in the flatness correction treatment made an improvement in the surface property of the raw material graphite film. Thus, the resultant graphite film was no unevenness to be very uniform.

The graphite films each subjected to the flatness correction treatment step were high in flatness, so that in the laminate test also, creases based on the bonding were not easily generated.

<Highest Temperature in Flatness Correction Treatment Step>

According to comparison of Examples 1 to 3, 19 to 21 and Comparative Example 2 with each other, as the highest temperature in the flatness correction treatment step was higher, the resultant graphite films were smaller in sagging and higher in flatness. In particular, when the highest temperature was 2600° C. or higher as in Examples 1, 2 and 19, the sagging Zgs of the resultant graphite films was 45 mm or less. Thus, the films were very good in flatness. On the other hand, when the highest temperature was 1800° C. or lower as in Comparative Example 2, the sagging was large.

Reasons therefor are as follows: As the highest temperature in the flatness correction treatment step was higher, a larger difference in expansion quantity was generated between the core and the raw material graphite film wound around the core, so that the sagging was more satisfactorily corrected. Moreover, as the temperature was higher, the rearrangement of the graphite crystallites was more actively caused.

<Highest Temperature in Graphitizing Step>

According to comparison of Examples 1, 4, 5, and 16 to 18 with each other, as the highest temperature in the graphitizing step was higher, the graphite films were smaller in sagging and higher in flatness. In particular, when the highest temperature was 2600° C. or higher as in Examples 1 and 4, the sagging Zgs of the resultant graphite films was 35 mm or less. Thus, the films were very good in flatness.

Figure 10:
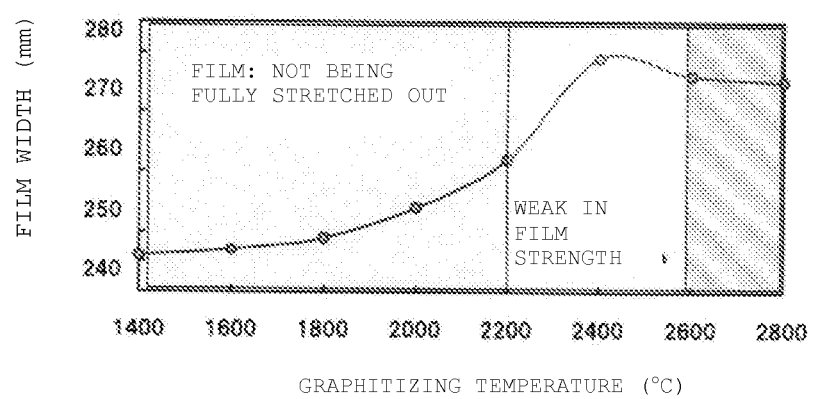
FIG. 10 shows an irreversible elongation of a film in a graphitizing step.

As shown in FIG. 10, in the graphitizing step, a film is stretched by about 10%. This is a change different from the thermal expansion, and is an irreversible structural change wherein carbon having an amorphous structure is arranged in the plane direction. Accordingly, even when a film subjected to heat treatment only up to a temperature of 1800° C. or lower is wound and fastened onto a core, the film is stretched to be separated away from the core so that no sagging thereof can be corrected. The reason why the advantageous effect of the sagging correction was exhibited, in particular, at 2600° C. or higher was that the films subjected to the heat treatment up to 2600° C. easily received the expansion force of the respective cores since the films were fully stretched. Moreover, the films were larger in strength than the films graphitized at 2200 to 2600° C. Thus, the re-winding works thereof were easily attained. Thus, in Example 1, the yield was better than in Examples 4, 5 and 16 to 18.

<Thermal Diffusivity in Plane Direction of Each Raw Material Graphite Film>

According to comparison of Examples 1, 4, 5 and 16 to 18 with each other, as the raw material graphite films were larger in thermal diffusivity in the plane direction, the resultant graphite films were higher in yield and flatness. When the thermal diffusivity in the plane direction of the raw material graphite films was, in particular, 4.0 cm$^2$/s or more as in Examples 1 and 4, the sagging Zgs of the resultant graphite films was 35 mm or less. Thus, the graphite films were very good in flatness.

The reason therefor is as follows: Even when the raw material graphite films having a thermal diffusivity less than 0.1 cm$^2$/s in the plane direction were each wound and fastened onto the core, the graphitization thereof was advanced in the flatness correction treatment step so that the film was stretched to be separated away from the core; thus, no sagging thereof was able to be corrected. The reason why the advantageous effect of the sagging correction was exhibited, in particular, about the film having a thermal diffusivity of 4.0 cm$^2$/s or more in the plane direction was that the film underwent a sufficient advance of graphitization to receive the expansion force of the core easily.

<Dimension Change in Each Raw Material Graphite Film at Temperature of 2400° C.>

According to comparison of Examples 1, 4, 5 and 16 to 18 with each other, as the dimension change was smaller in the raw material graphite films at a temperature of 2400° C., the resultant graphite films were higher in yield and flatness. About the raw material graphite films having a dimension change of 0.0% as in Examples 1 and 4, the sagging Zgs of the resultant graphite films was 35 mm or less. Thus, it was verified that the films were very good in flatness.

<Evaluation (Reflection XRD) of Half Band Width of Peak of 002 Plane of Each Raw Material Graphite Film>

According to comparison of Examples 1, 4, 5 and 16 to 18 with each other, as the estimated-value of the half band width of the 002 plane peak of the raw material graphite films was smaller, the resultant graphite films were higher in yield and flatness. About the raw material graphite films having a half band width estimated-value of 0.3 or less as in Examples 1 and 4, the sagging Zgs of the resultant graphite films was 35 mm or less. Thus, it was verified that the films were very good in flatness.

<Linear Expansion Coefficient (Linear Expansion Rate) of Each Core in Flatness Correction Treatment Step>

According to comparison of Examples 1, 6 and 7 with each other, as the linear expansion coefficient (linear expansion rate) of the cores in the flatness correction treatment step was larger, the resultant graphite films were smaller in sagging to be higher in flatness. Moreover, in Example 1, tear defects were less easily generated and the yield was also better than in Example 7. This is because in Example 1 the thermal expansion coefficient of the core was appropriate so that the raw material graphite film was able to be restrained from being torn by the expansion of the core. When the linear expansion coefficient (linear expansion rate) of the core was particularly 2.0×10$^{-6}$/K or more and 5.0×10$^{-6}$/K or less, the sagging of the film was able to be sufficiently corrected without generating any tear defect in the film.

<Diameter of Each Core in Flatness Correction Treatment Step>

According to comparison of Examples 1, 8 and 9 with each other, as the diameter of the cores was larger in the flatness correction treatment step, the resultant graphite films were small in sagging to be higher in flatness. This is because as the diameter of the cores was larger, the cores were larger in elongation quantity to give a larger correction effect. Moreover, as the core diameter was larger, the number of the wind around the core was smaller so that force from the core was more easily transmitted to the outside of the wind. In particular, in Examples 1 and 9, which had a core diameter of 60 mm or more, the resultant graphite films were small in sagging to be high in flatness.

<About Torque at Time of Re-winding>

According to comparison of Examples 1, and 10 to 12 with each other, as the torque was larger at the time of the re-winding, the resultant graphite films were smaller in sagging to be higher in flatness. This is because as the torque was larger at the time of the re-winding, the fastening of the films onto the respective cores was stronger so that the films were more satisfactorily corrected when the flatness correction treatment step was performed.

In Example 1, tear defects was also less generated than in Example 10.

<Advantageous Effect of Vertical Re-winding>

According to comparison of Examples 1, 26 and 27 with each other, in Example 1, wherein the re-winding step was performed in the state that the raw material graphite film was vertically wound, and Example 27, wherein the edge position control was used, the re-winding was able to be attained in the state that edges thereof were consistent with each other, so that the flatness correction effect and the yield were high. This is because when the edges were consistent with each other, force from the core was able to be evenly transmitted in the flatness correction treatment.

<Embodiments where Flatness Correction Treatment Step was Conducted in Series of Graphite Producing Steps>

Examples 22 to 25 were about embodiments where the flatness correction treatment step was performed in the graphitizing step. In Example 22, the graphite members different in thermal expansion coefficient were combined with each other, whereby pressure was applied to the film by the thermal expansion difference near the highest temperature in the graphitizing step. In Example 23, the hot-press was performed at 2600° C. or higher to correct the film. In Example 24, the film loosened from the core in the graphitizing step was wound by rotating the core in the state that the film was kept at a high temperature of 2600° C., and then in this state the film was treated up to 2900° C. to be subjected to the flatness correction treatment by the thermal expansion difference between the core and the film. In Example 25, in addition of the steps in Example 24, the flatness correction treatment was performed while the film was pushed and expanded outward from the core by dividing and expanding the core.

As has been shown in FIG. 10, with the graphitization, the film size increases. However, it is preferred to apply pressure to the film at a temperature of 2600° C. or higher, at which the film is fully stretched, without giving any load to the film when the size increases. In each of Examples 22 to 25, such a measure was taken so that the resultant graphite film was small in sagging to be high in flatness.

Moreover, the flatness correction treatment step was performed in the graphitizing step, whereby the number of the steps was able to be reduced so that the films of these examples were able to be improved in productivity.

<Degree of Correction of Each of Polymer-Fired Type and Natural Graphite Type Graphite Films>

Examples 1 and 15 are compared with each other. In Example 1, wherein the raw material graphite film was the polymer-fired graphite film, the correction effect was larger than in Example 15, wherein the raw material graphite film was the natural graphite type graphite film. The reason therefor is as follows: in the polymer-fired graphite film, graphite crystallites were highly oriented in the plane direction so that the film was not thermally expanded with ease. Thus, in the flatness correction treatment, the film was easily pushed and expanded from the core.

LIST OF REFERENCE NUMERALS 21 graphite composite film
22 enlarged view
23 creases based on bonding
31 winding-slippage defect of graphite film
41 heavy stone
42 raw material graphite film
43 base
51 at room temperature
52 in heat treatment
53 raw material graphite film
54 core
61 base
62 driving axis
63 core
64 double sided adhesive tape
65 raw material graphite film
66 cross section after re-winding
67 radius of outermost circumference of wind of raw material graphite film
68 center of driving axis
69 radius of core
610 thickness of wind of raw material graphite film
71 cylindrical core made of graphite
72 outer cylinder
73 polyimide film wound around cylindrical core
74 openings for air permeability
81 support
82 carbonized film
91 roll 1
92 roll 2
93 polymeric film
94 catenary
95 sagging
96 roll-putting-on/off axis onto which film is to be put
111 inside of wind
112 outside of wind
121 sheet having adhesive layer, or adhesion layer
122 winding-out roller for sheet having adhesive layer, or adhesion layer
123 first roll
124 second roll
125 separator
126 separator winding-up roll
127 bar for giving a trigger for starting to peel off separator
128 separator-attached PET tape
129 graphite film width
1210 width of sheet having adhesive layer, or adhesion layer
1211 winding-out roller for graphite film
1212 graphite film
131 tear defect
141 raw material graphite film
142 graphite film after flatness correction treatment
151 structure 1
152 structure 2
153 structure 3
154 structure 4
155 structure 5
156 structure 6
157 LED chip
158 glass epoxy substrate
159 metallic substrate
1510 graphite film
161 core having expandable function
162 raw material graphite film
163 state after expanding
171 tool small in thermal expansion coefficient
172 tool large in thermal expansion coefficient
173 sheet-form carbonized film

The invention claimed is:

1. A product consisting of a single layer graphite film, the single layer graphite film having a width Ugs and a sagging Zgs determined by using a sagging evaluation described in JIS C2151, wherein the ratio Zgs/Ugs is a value of 0.2 or less, wherein the graphite film has a width Ugs of 100 mm or more, a thickness of from 7 μm to 120 μm, and a length of 1 m or more.

2. The product according to claim 1, wherein the single layer graphite film is obtained by graphitizing a carbonized polyimide film in a slate that the carbonized polyimide film is wound into a roll from, wherein the single layer graphite film has a thermal diffusivity in a plane direction of 5.0 cm$^2$/s or more, and an area of 5 m$^2$ or more.

3. The product according to claim 1, wherein the single layer graphite film has a width Ugs of 200 mm or more.

4. The product according to claim 1, wherein the single layer graphite film has a width Ugs of 400 mm or more.

5. The product according to claim 1, wherein the single layer graphite film has a length of 10 m or more.

6. The product according to claim 1, wherein the single layer graphite film has a length of 25 m or more.

7. The product according to claim 1, wherein the single layer graphite film has an area of 5 m$^2$ or more.

8. The product according to claim 1, wherein the single layer graphite film has an area of 10 m$^2$ or more.

9. The product according to claim 1, wherein the single layer graphite film has an area of 20 m$^2$ or more.

10. A product consisting of a single layer graphite film, the single layer graphite film made by the process of subjecting a raw material consisting of a graphite single layer film to heat treatment at a temperature of 2000° C. or higher while a pressure is applied to the raw material graphite film, wherein the resulting single layer graphite film has a width Ugs and a sagging Zgs determined by using a sagging evaluation described in JIS C2151, wherein the ratio Zgs/Ugs is a value of 0.2 or less, and wherein the graphite film has a width Ugs of 100 mm or more, a thickness of from 7 μm to 120 μm and a length of 1 m or more.

11. The product according to claim 10, wherein the single layer graphite film has a width Ugs of 200 mm or more.

12. The product according to claim 10, wherein the single layer graphite film has a width Ugs of 400 mm or more.

13. The product according to claim 10, wherein the single layer graphite film has a length of 10 m or more.

14. The product according to claim 10, wherein the single layer graphite film has a length of 25 m or more.

15. The product according to claim 10, wherein the single layer graphite film has an area of 5 m² or more.

16. The product according to claim 10, wherein the single layer graphite film has an area of 10 m² or more.

17. The product according to claim 10, wherein the single layer graphite film has an area of 20 m² or more.

18. The product according to claim 1, wherein the ratio Zgs/Ugs is a value of 0.16 or less.

19. The product according to claim 1, wherein the ratio Zga/Ugs is a value of 0.11 or less.

* * * * *

UNITED STATES PATENT AND TRADEMARK OFFICE
CERTIFICATE OF CORRECTION

PATENT NO.         : 10,377,635 B2
APPLICATION NO.    : 14/515200
DATED              : August 13, 2019
INVENTOR(S)        : Yusuke Ohta et al.

It is certified that error appears in the above-identified patent and that said Letters Patent is hereby corrected as shown below:

In the Claims

Column 34, Line 41: Claim 2 "polyimide film in a slate that the carbonized polyimide film is wound into a roll from, wherein the single layer graphite" should be -- polyimide film in a state that the carbonized polyimide film is wound into a roll form, wherein the single layer graphite --

Signed and Sealed this
Seventh Day of April, 2020

Andrei Iancu
*Director of the United States Patent and Trademark Office*